(12) United States Patent
Mogi

(10) Patent No.: US 11,988,895 B2
(45) Date of Patent: May 21, 2024

(54) OBSERVATION OPTICAL SYSTEM AND APPARATUS HAVING THE SAME

(71) Applicant: CANON KABUSHIKI KAISHA, Tokyo (JP)

(72) Inventor: Shuichi Mogi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/409,524

(22) Filed: Aug. 23, 2021

(65) Prior Publication Data

US 2022/0057600 A1 Feb. 24, 2022

(30) Foreign Application Priority Data

Aug. 24, 2020 (JP) ................. 2020-141265

(51) Int. Cl.
  *G02B 9/14* (2006.01)
  *G02B 9/34* (2006.01)
  *G02B 13/00* (2006.01)
  *G02B 13/16* (2006.01)
  *G02B 25/00* (2006.01)

(52) U.S. Cl.
  CPC ............... *G02B 9/14* (2013.01); *G02B 9/34* (2013.01); *G02B 13/0035* (2013.01); *G02B 13/16* (2013.01); *G02B 25/001* (2013.01)

(58) Field of Classification Search
  CPC ........ G02B 9/14; G02B 9/34; G02B 13/0035; G02B 13/16; G02B 25/001
  USPC ...................... 359/785, 618–640.785; 396/51
  See application file for complete search history.

(56) References Cited

U.S. PATENT DOCUMENTS

| | | | |
|---|---|---|---|
| 9,454,062 B2 | 9/2016 | Matsuo | |
| 2002/0113949 A1* | 8/2002 | Sugawara | ............ G02B 27/145 |
| | | | 353/31 |
| 2012/0127595 A1 | 5/2012 | Matsuo | |
| 2014/0198391 A1* | 7/2014 | Sato | ................... G02B 13/0035 |
| | | | 359/645 |
| 2019/0187354 A1 | 6/2019 | Kuo et al. | |

FOREIGN PATENT DOCUMENTS

| | | | | |
|---|---|---|---|---|
| CN | 204101801 U | | 1/2015 | |
| JP | H0792375 A | * | 4/1995 | ............... G02B 7/28 |
| JP | H0792375 A | | 4/1995 | |
| JP | H1172699 A | | 3/1999 | |
| JP | 2002048985 A | | 2/2002 | |
| JP | 2004258653 A | | 9/2004 | |
| JP | 2010134446 A | | 6/2010 | |
| JP | 2012-068302 A | | 4/2012 | |
| JP | 2012510077 A | | 4/2012 | |

(Continued)

*Primary Examiner* — George G. King
(74) *Attorney, Agent, or Firm* — CANON U.S.A., INC. IP Division

(57) ABSTRACT

An observation optical system includes, in order from a display panel side to an observation side, a first lens having a positive refractive power, a second lens having a negative refractive power, and a third lens having a positive refractive power, and an optical path brancher configured to branch an optical path, and disposed between a display panel and the first lens. An absolute value of a radius of curvature of a lens surface on the observation side of the first lens is smaller than that on the display panel side of the first lens. A predetermined condition is satisfied.

21 Claims, 12 Drawing Sheets

(56) References Cited

FOREIGN PATENT DOCUMENTS

| | | |
|---|---|---|
| JP | 2014074814 A | 4/2014 |
| JP | 2016-166969 A | 9/2016 |
| JP | 2016166968 A | 9/2016 |
| JP | 2018189879 A | 11/2018 |
| JP | 2019-109496 A | 7/2019 |

* cited by examiner

OBSERVATION OPTICAL SYSTEM AND APPARATUS HAVING THE SAME

BACKGROUND OF THE DISCLOSURE

Field of the Disclosure

The aspect of the embodiments relates generally to an optical system, and more particularly to an optical system suitable for an electronic viewfinder.

Description of the Related Art

There has conventionally been known an observation optical system that is used to observe a display panel having a diagonal length of about 10 mm, and includes, in order from the display panel side to the observation side, a first lens having a positive refractive power, a second lens having a negative refractive power, and a third lens having a positive refractive power (see Japanese Patent Laid-Open No. ("JP") 2019-109496).

Recently, a proposal has been made to add to an observation optical system a visual line detecting function that detects a visual line of an observer who is observing the display panel and finds which position on the panel is being viewed. The visual line detecting function when added enables a main object to be selected and various operations to be performed based on visual line direction information. In order to detect the visual line of the observer, an optical path brancher that branches and extracts part of a light beam is disposed on a viewfinder optical path.

However, the optical system disclosed in JP 2019-109496 could not restrain various aberrations, even if it included the optical path brancher and the visual line detecting function, because the optical characteristic and the position of the optical path brancher are not clearly determined. In addition, the optical system disclosed in JP 2019-109496 includes a negative lens having a concave shape that is strong on the observation side, and thus has difficulty in securing a sufficient eye point length.

SUMMARY OF THE DISCLOSURE

An observation optical system according to one aspect of the embodiments includes, in order from a display panel side to an observation side, a first lens having a positive refractive power, a second lens having a negative refractive power, and a third lens having a positive refractive power, and an optical path brancher configured to branch an optical path, and disposed between a display panel and the first lens. An absolute value of a radius of curvature of a lens surface on the observation side of the first lens is smaller than an absolute value of a radius of curvature of a lens surface on the display panel side of the first lens. The following inequalities are satisfied:

$$0.5 < d1/f < 2.0$$

$$0.0 < d23/d12 < 0.5$$

where d1 is a distance from a display plane of the display panel to the lens surface on the display panel side of the first lens, f is a focal distance of the observation optical system, d23 is a distance on an optical axis from a lens surface on the observation side of the second lens to a lens surface on the display panel side of the third lens, and d12 is a distance on the optical axis from the lens surface on the observation side of the first lens to a lens surface on the display panel side of the second lens. An apparatus having the above observation optical system also constitutes another aspect of the embodiments.

Further features of the disclosure will become apparent from the following description of exemplary embodiments with reference to the attached drawings.

DESCRIPTION OF THE EMBODIMENTS

Figure 1:
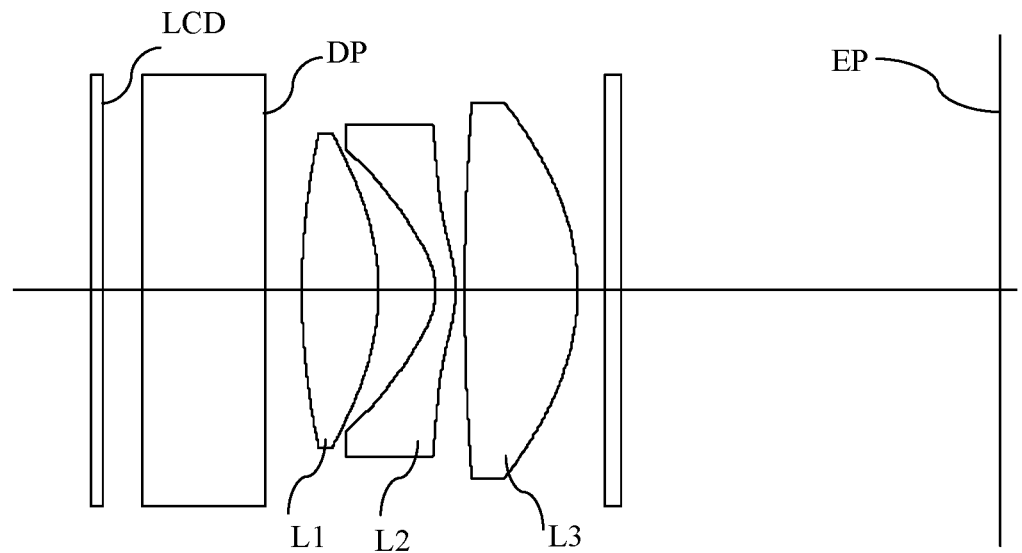
FIG. 1 is a sectional view showing a lens configuration of an observation optical system according to Example 1.
Figure 2:
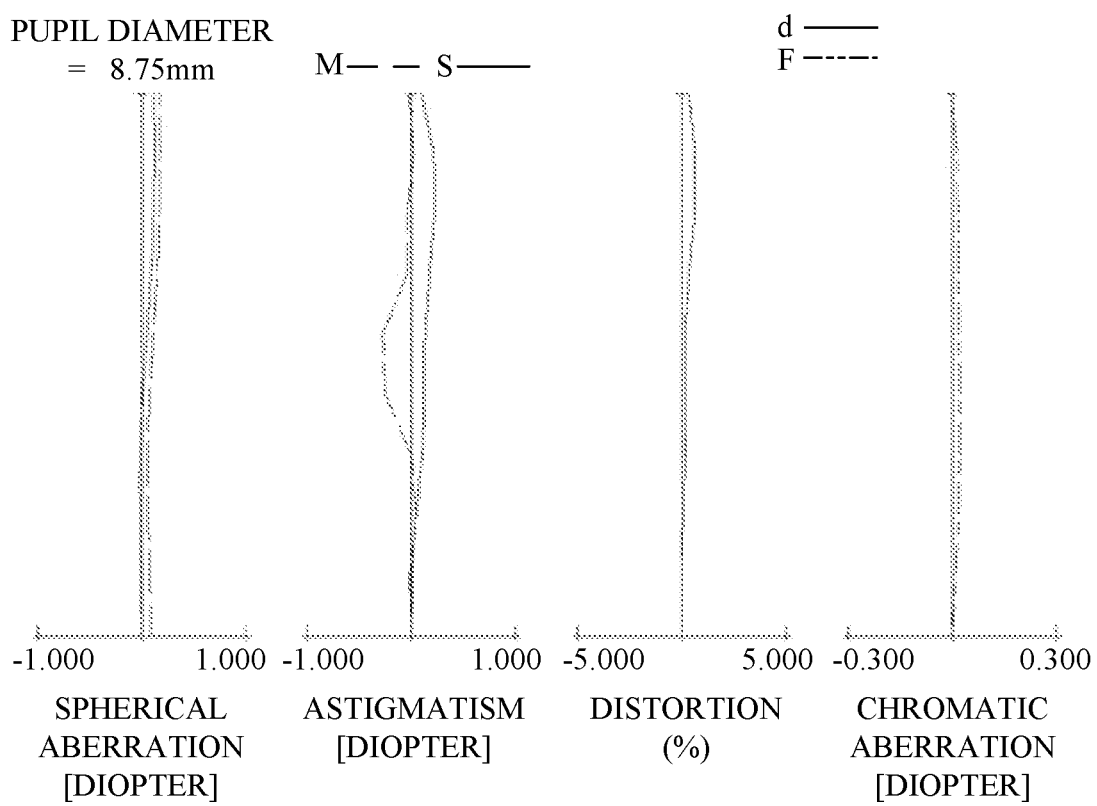
FIG. 2 is an aberration diagram of the observation optical system according to Example 1.
Figure 3:
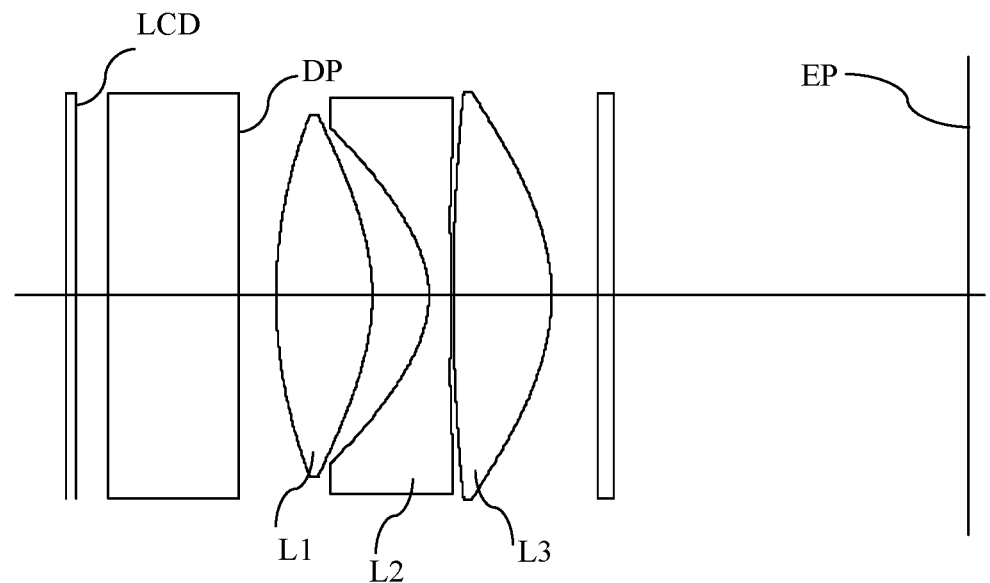
FIG. 3 is a sectional view showing a lens configuration of an observation optical system according to Example 2.
Figure 4:
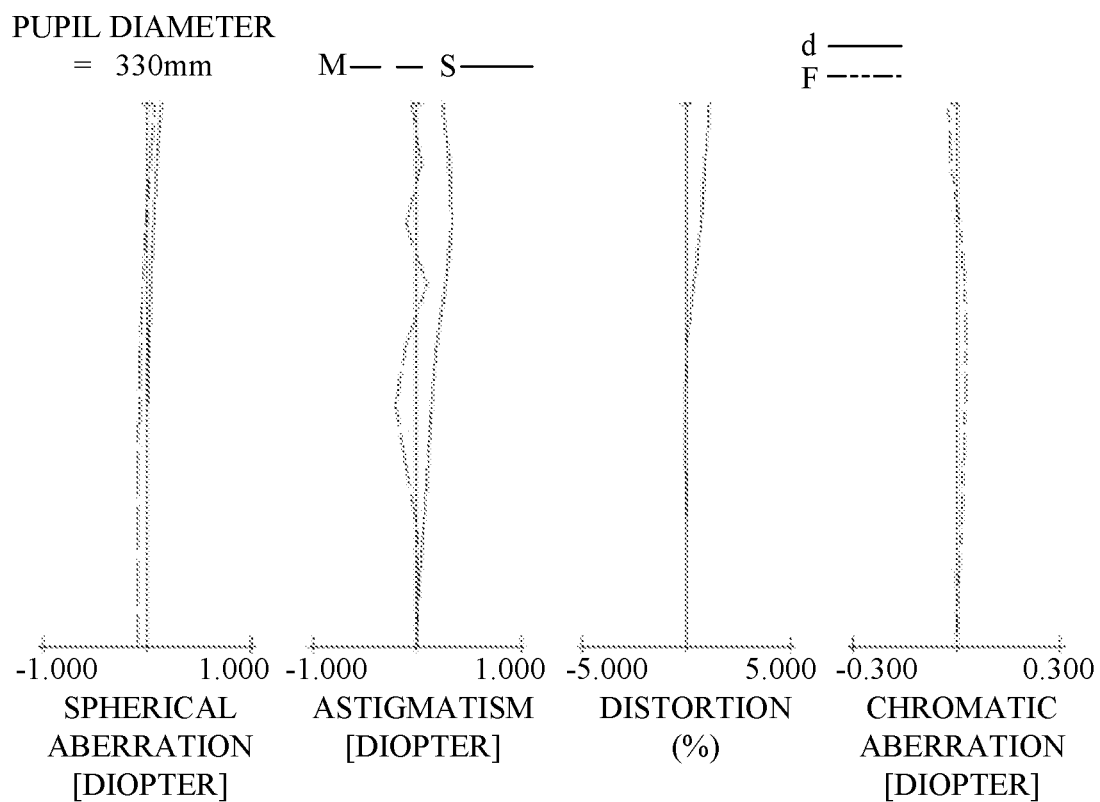
FIG. 4 is an aberration diagram of the observation optical system according to Example 2.
Figure 5:
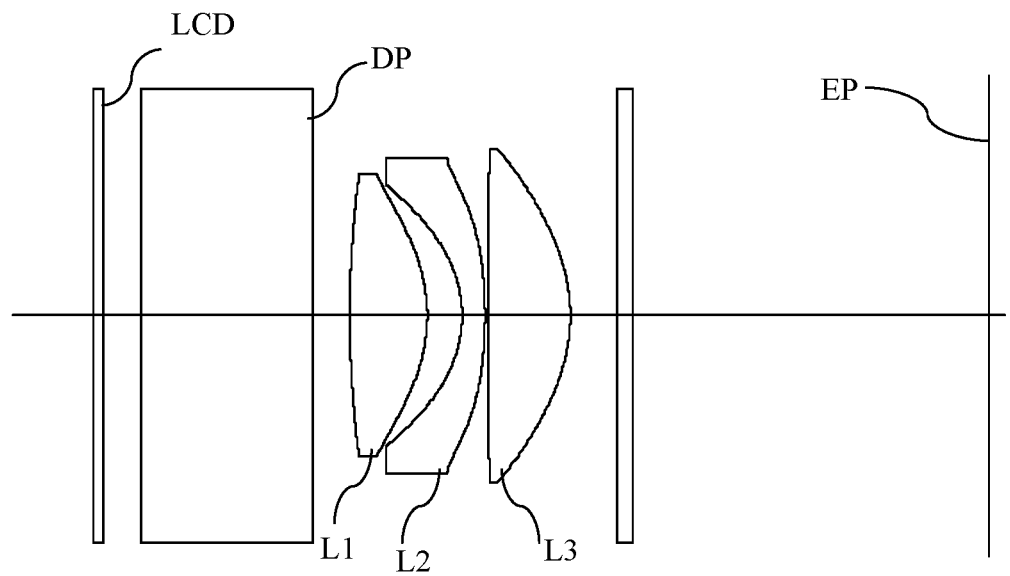
FIG. 5 is a sectional view showing a lens configuration of an observation optical system according to Example 3.
Figure 6:
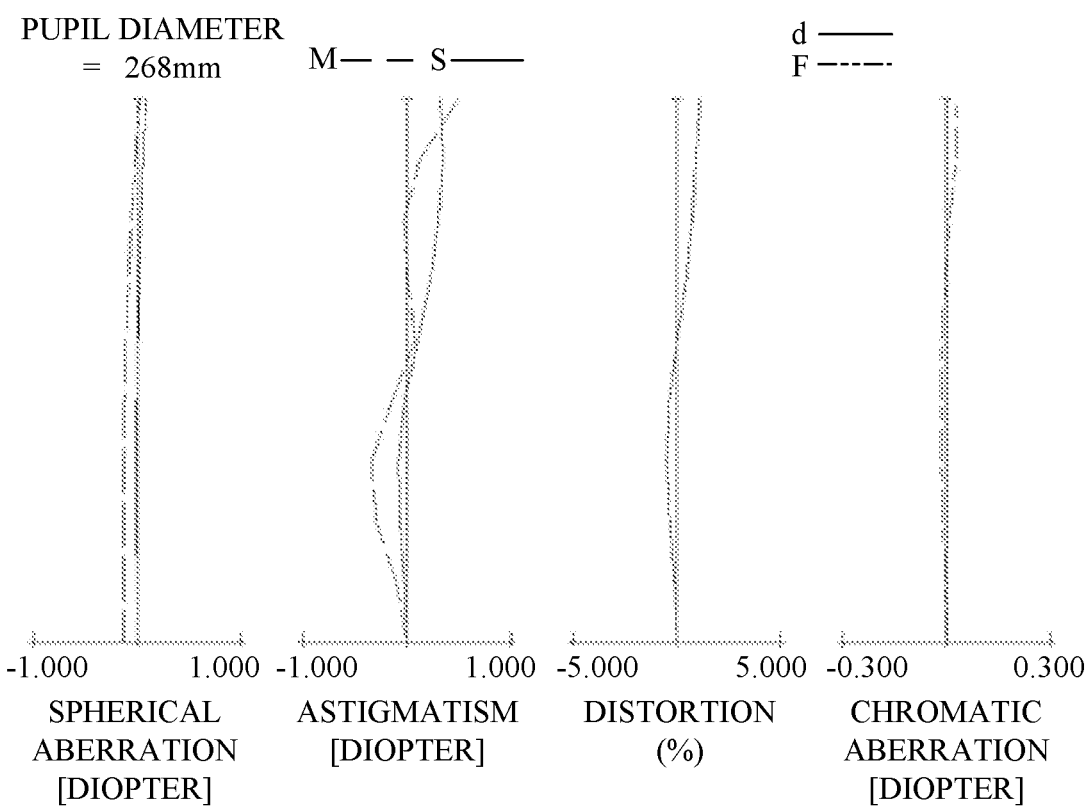
FIG. 6 is an aberration diagram of the observation optical system according to Example 3.
Figure 7:
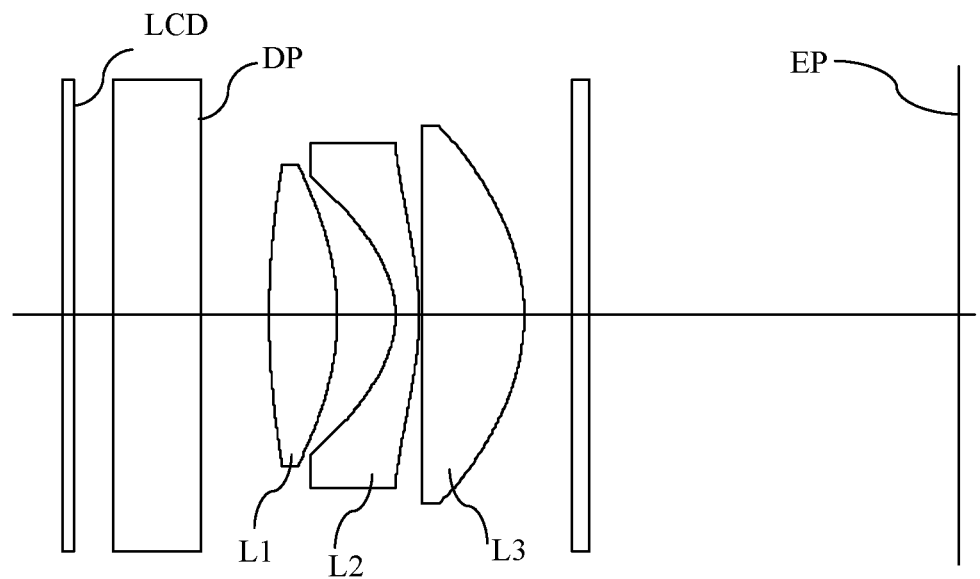
FIG. 7 is a sectional view showing a lens configuration of an observation optical system according to Example 4.
Figure 8:
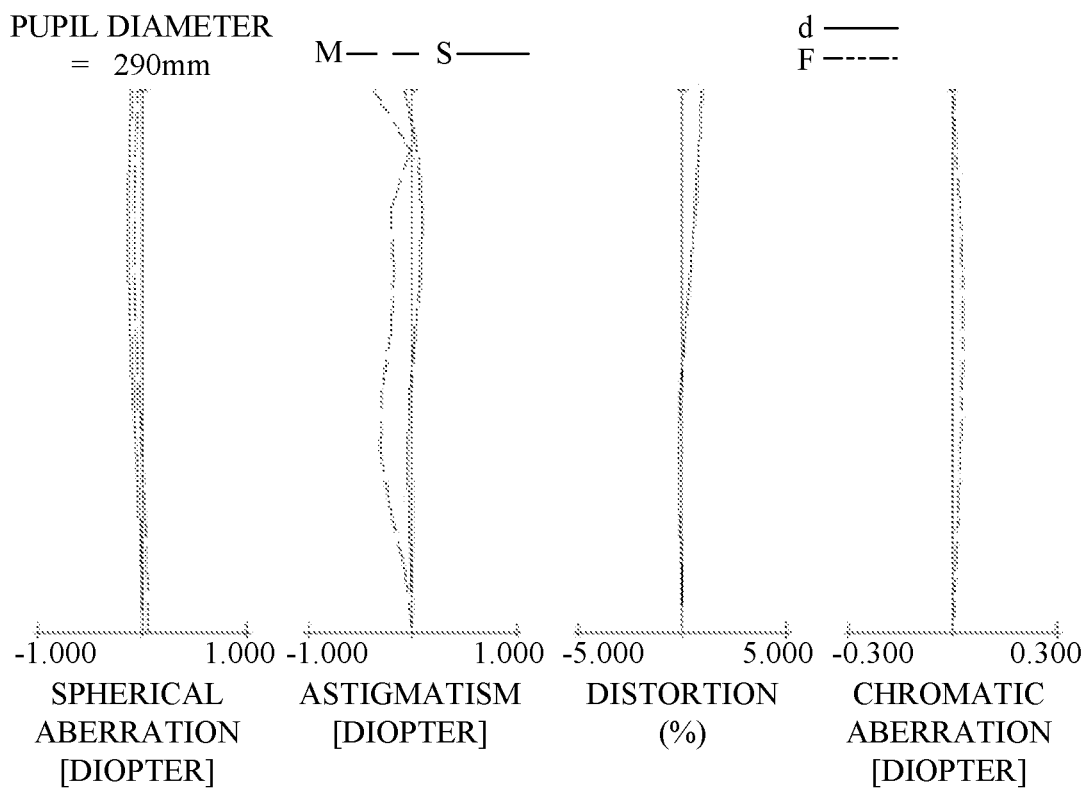
FIG. 8 is an aberration diagram of the observation optical system according to Example 4.
Figure 9:
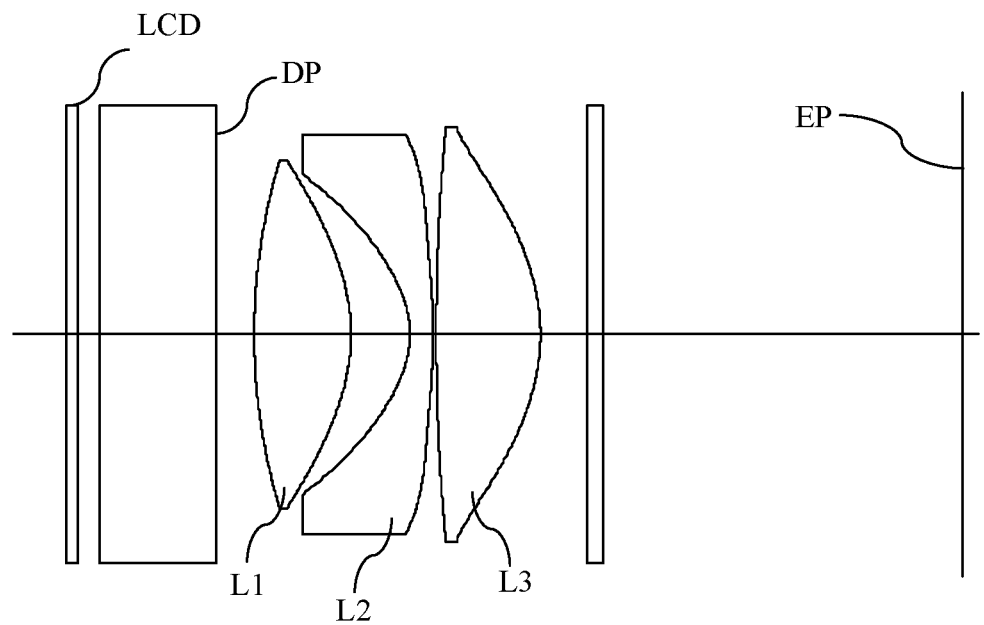
FIG. 9 is a sectional view showing a lens configuration of an observation optical system according to Example 5.
Figure 10:
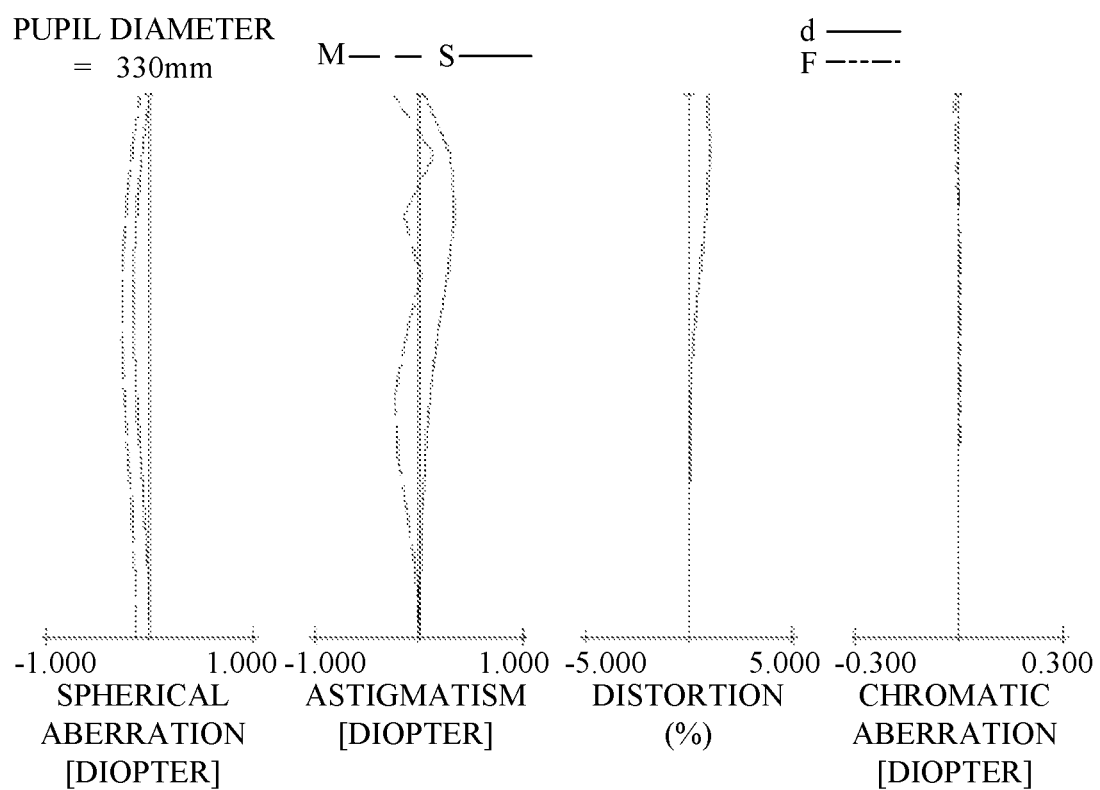
FIG. 10 is an aberration diagram of the observation optical system according to Example 5.
Figure 11:
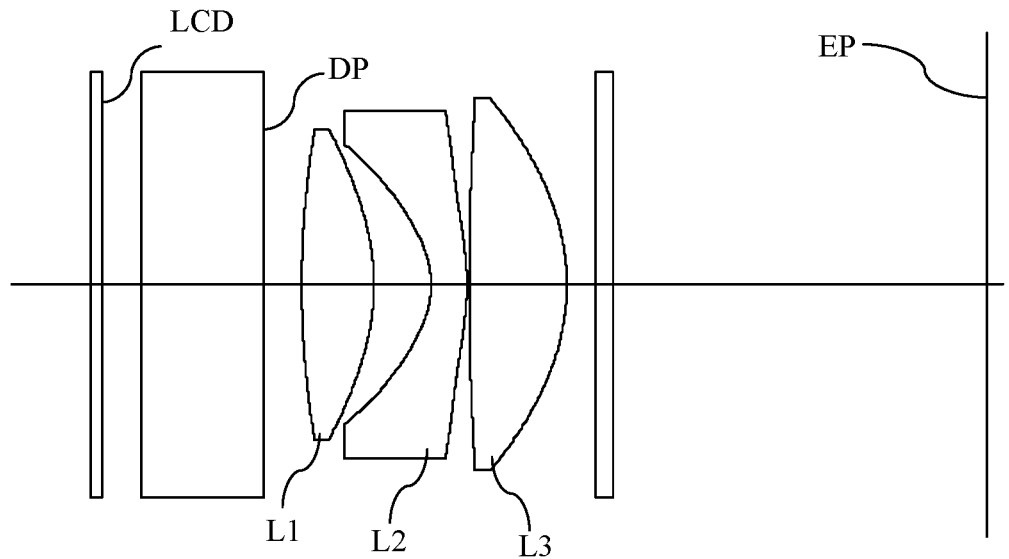
FIG. 11 is a sectional view showing a lens configuration of an observation optical system according to Example 6.
Figure 12:
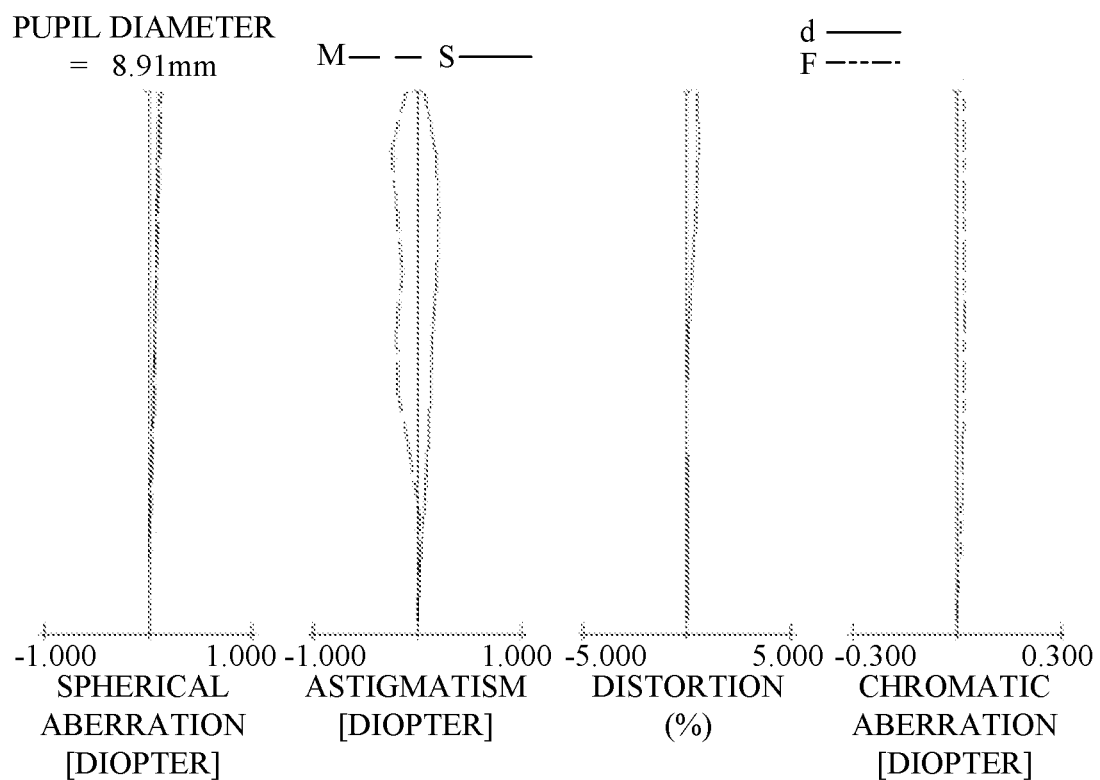
FIG. 12 is an aberration diagram of the observation optical system according to Example 6.
Figure 13:
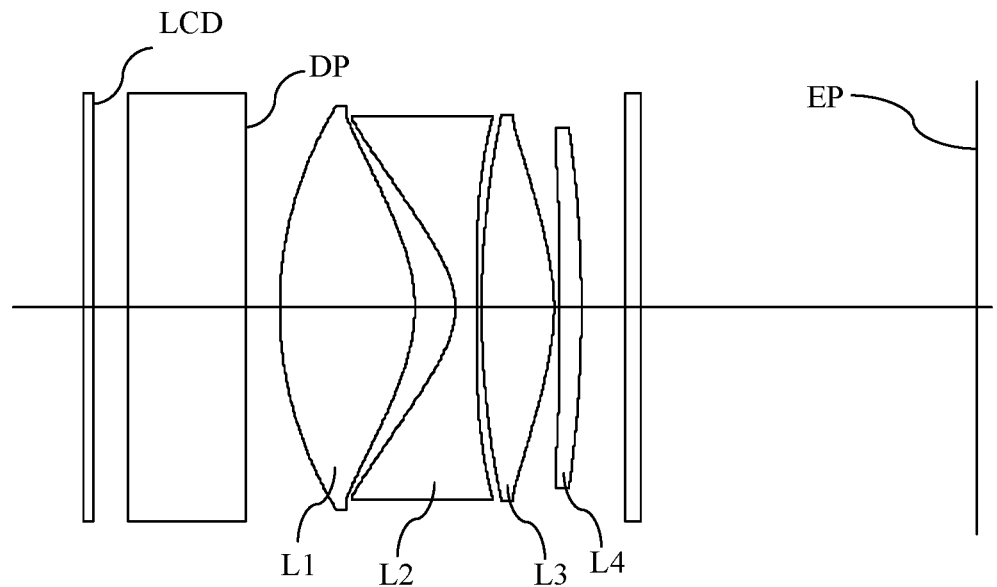
FIG. 13 is a sectional view showing a lens configuration of an observation optical system according to Example 7.
Figure 14:
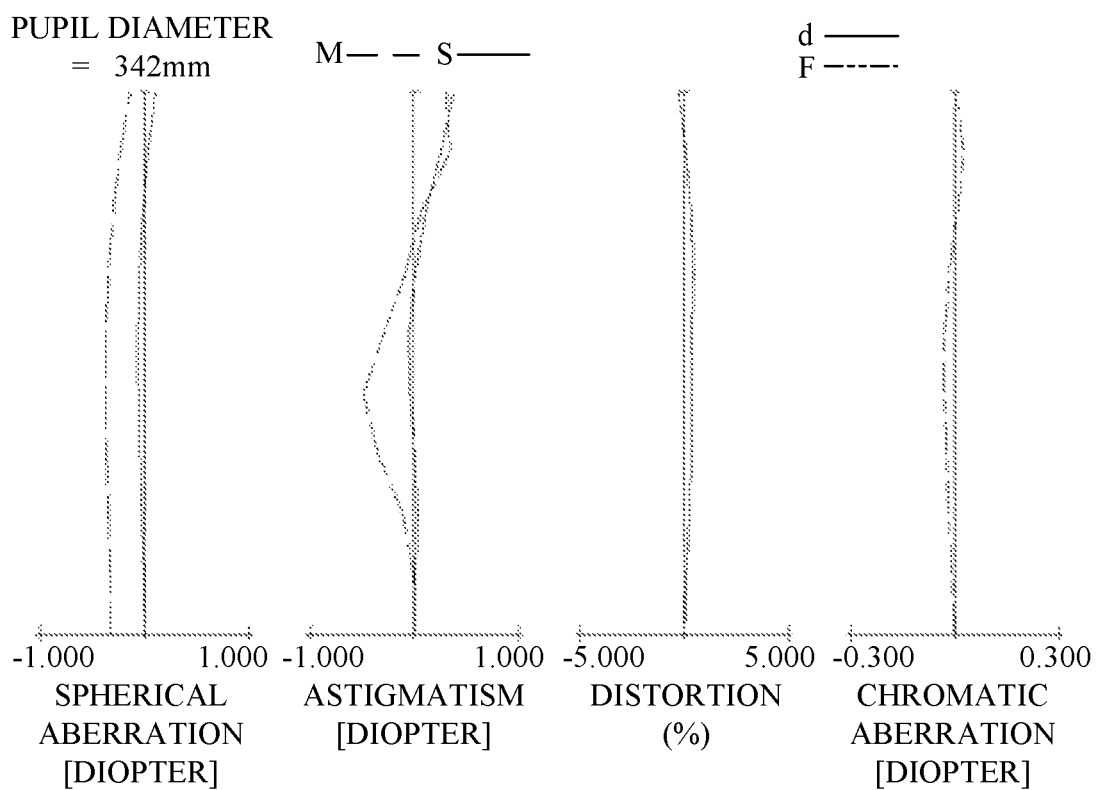
FIG. 14 is an aberration diagram of the observation optical system according to Example 7.
Figure 15:
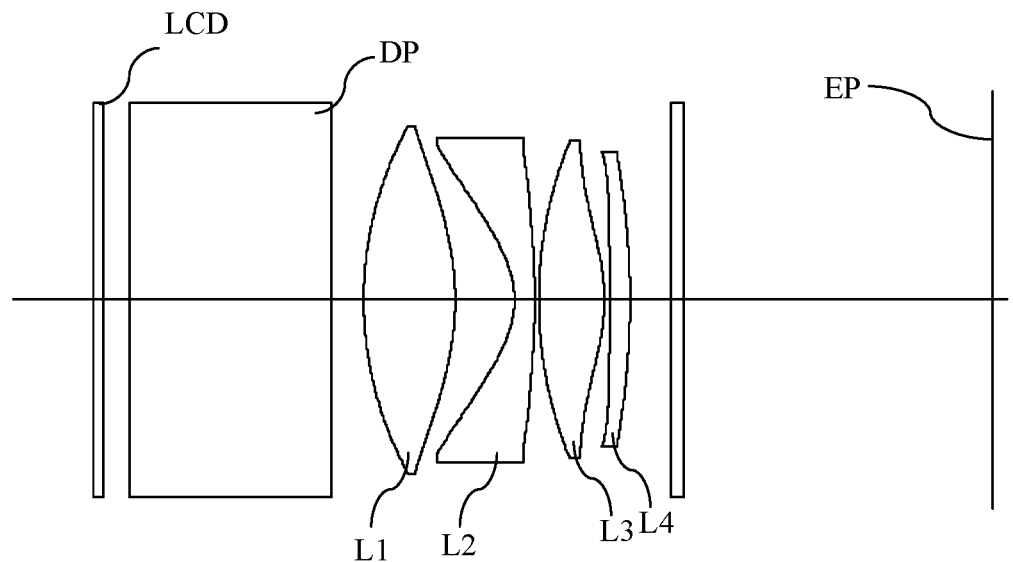
FIG. 15 is a sectional view showing a lens configuration of an observation optical system according to Example 8.
Figure 16:
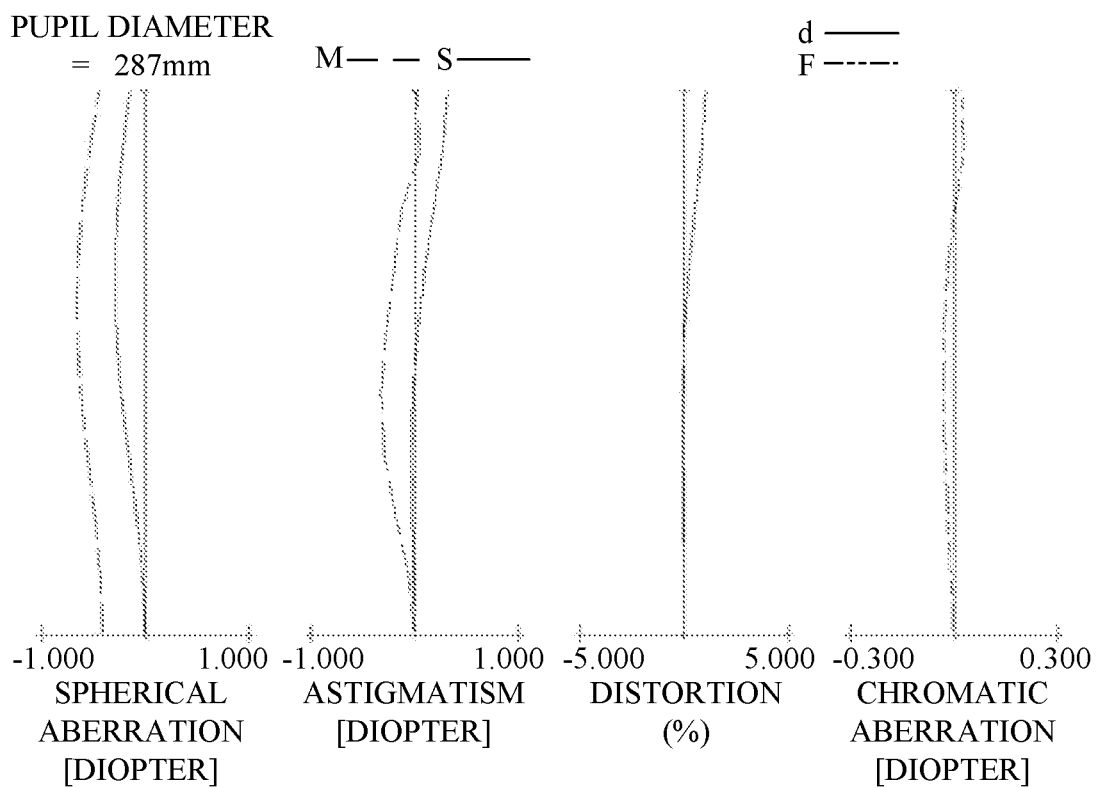
FIG. 16 is an aberration diagram of the observation optical system according to Example 8.
Figure 17:
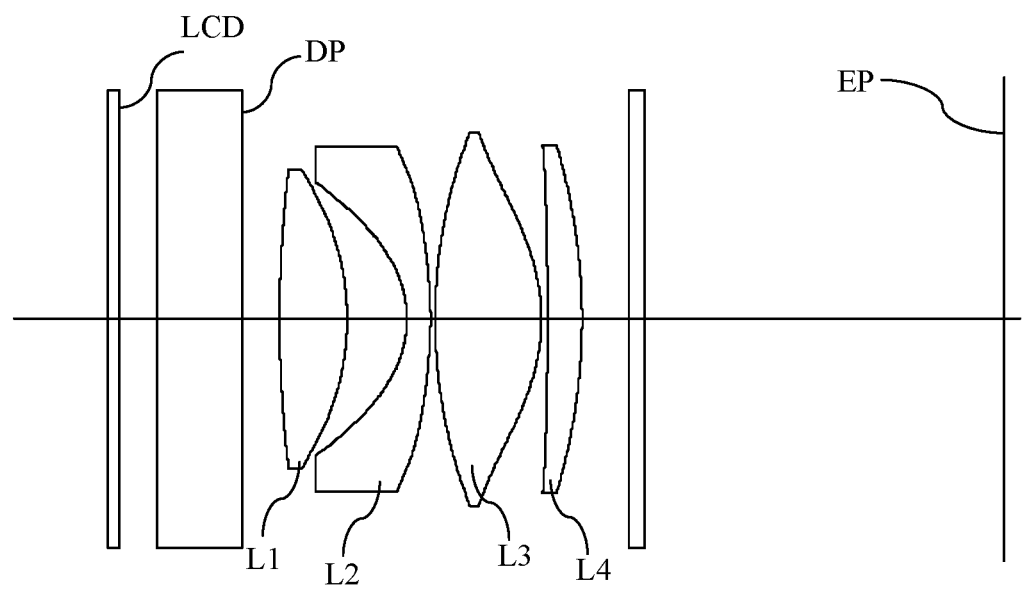
FIG. 17 is a sectional view showing a lens configuration of an observation optical system according to Example 9.
Figure 18:
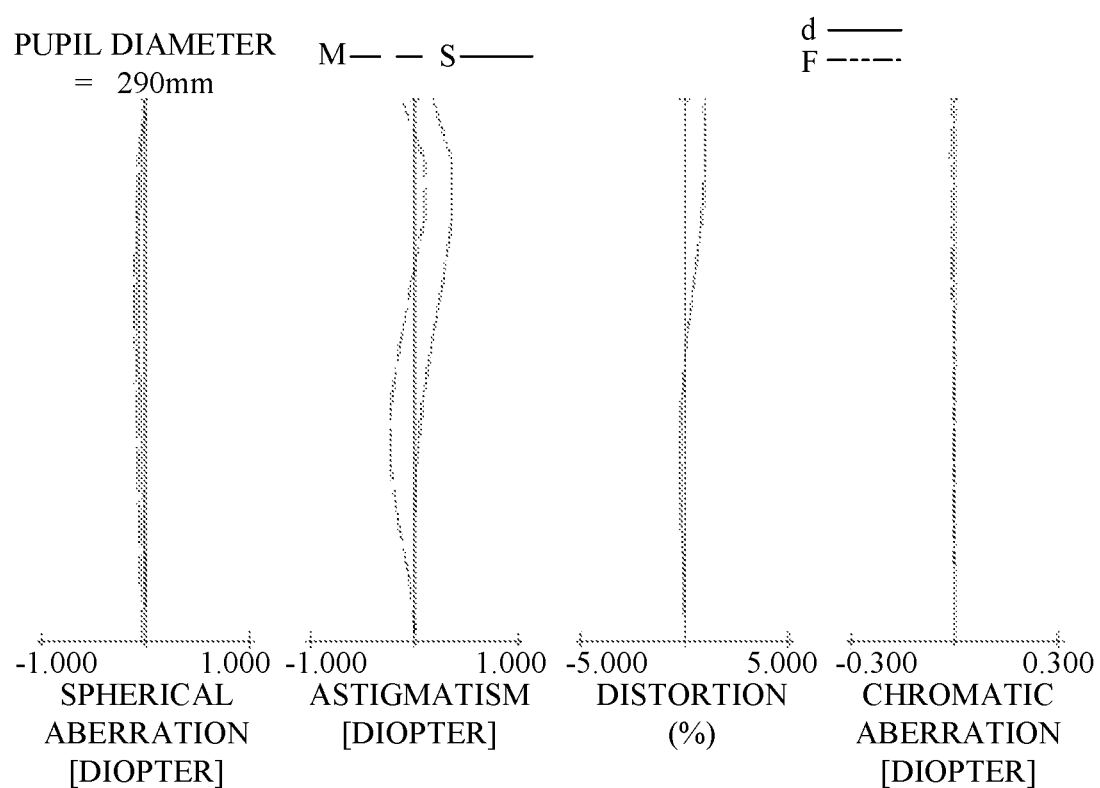
FIG. 18 is an aberration diagram of the observation optical system according to Example 9.
Figure 19:
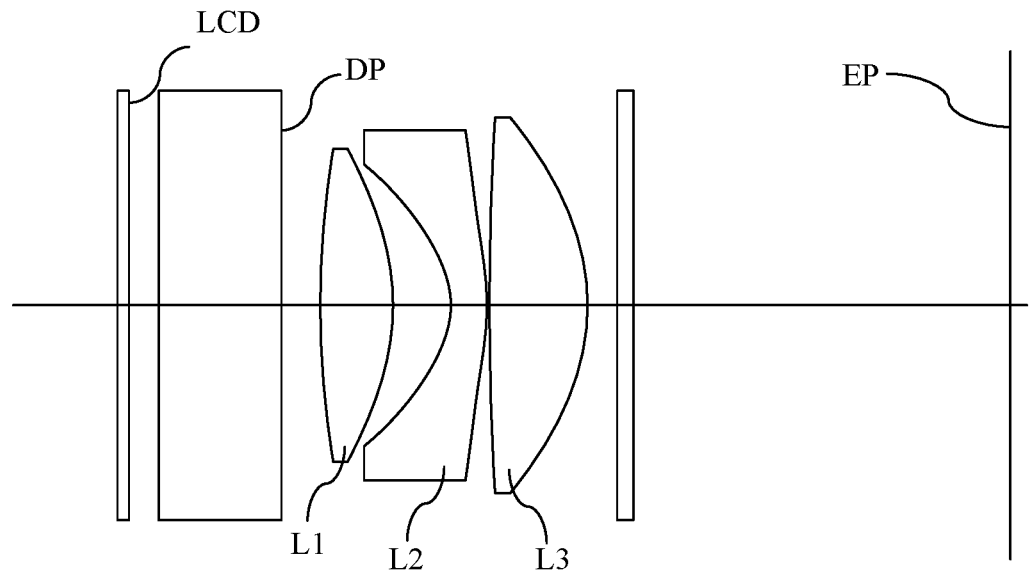
FIG. 19 is a sectional view showing a lens configuration of an observation optical system according to Example 10.
Figure 20:
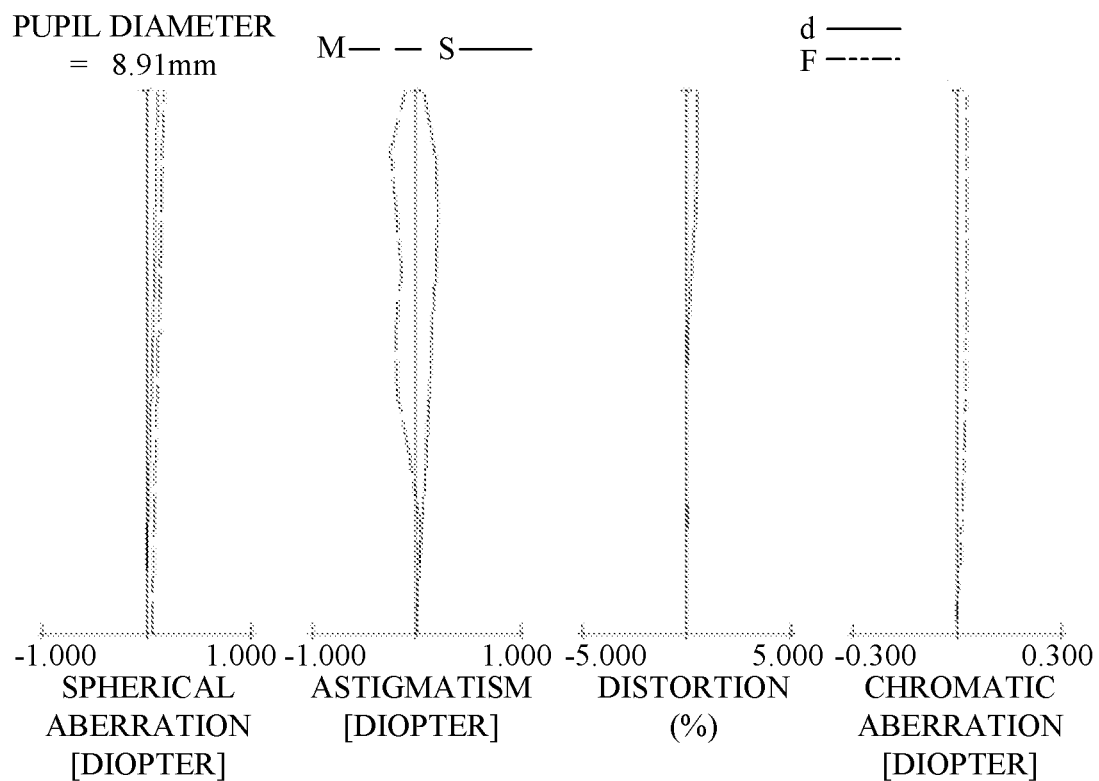
FIG. 20 is an aberration diagram of the observation optical system according to Example 10.
Figure 21:
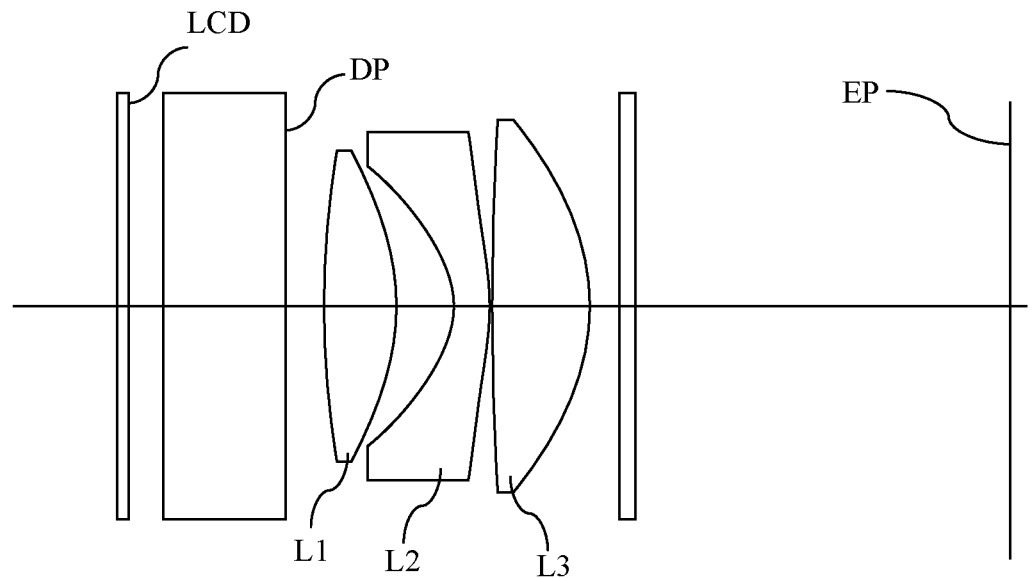
FIG. 21 is a sectional view showing a lens configuration of an observation optical system according to Example 11.
Figure 22:
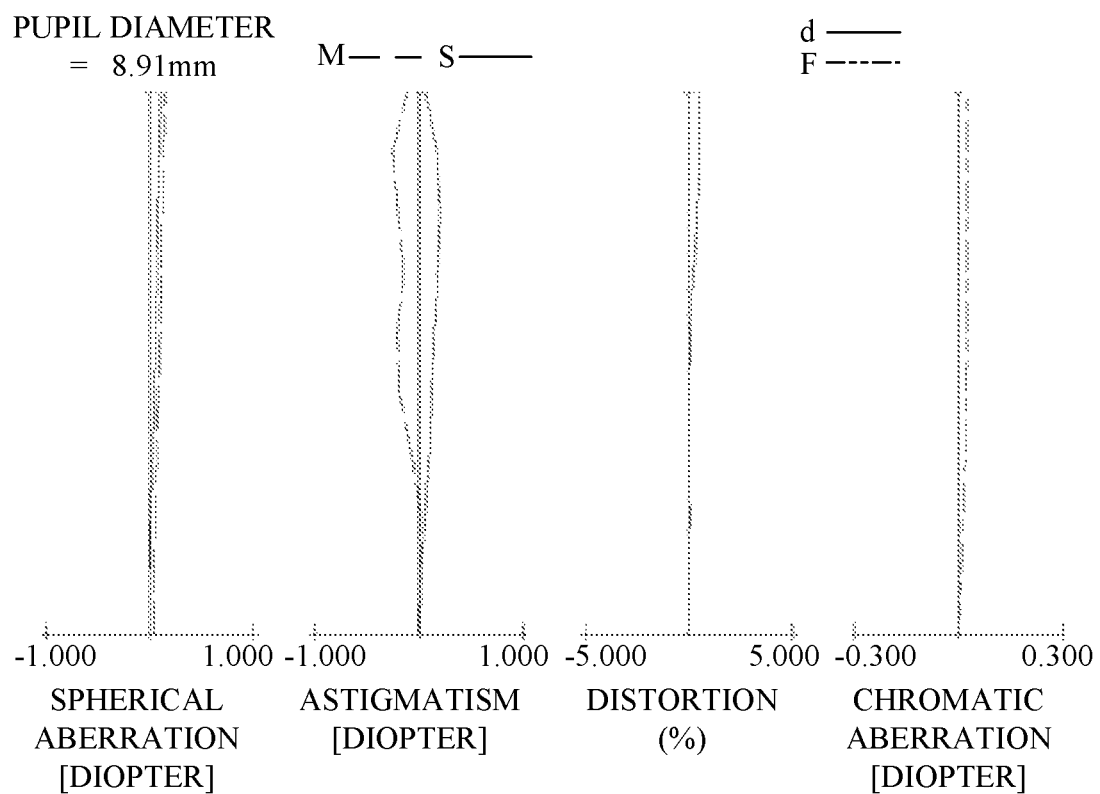
FIG. 22 is an aberration diagram of the observation optical system according to Example 11.

Referring now to the accompanying drawings, a detailed description will be given of embodiments according to the disclosure. Corresponding elements in respective figures will be designated by the same reference numerals, and a duplicate description thereof will be omitted.

FIGS. 1, 3, 5, 7, 9, 11, 13, 15, 17, 19, and 21 are sectional views showing the lens configurations of observation optical systems according to Examples 1 to 11, respectively. In each sectional view, the left side is the display panel side (object side), and the right side is the observation side (exit side).

The observation optical system according to each example is used, for example, for an electronic viewfinder in an image pickup apparatus.

In order to magnify and observe a small display panel with a diagonal length of about 10 mm at an angle of view of 35 to 45 degrees, the observation optical system uses a strong positive refractive power. In the peripheral area of the object, as the height from the center increases, the curvature of field and astigmatism occur, and the optical performance deteriorates. In order to correct the curvature of field and astigmatism, the observation optical system according to each example includes, in order from the display panel side to the observation side, a first lens L1 having a positive refractive power, a second lens L2 having a negative refractive power, and a third lens L3 having a positive refractive power. This lens configuration can easily provide the observation optical system with a high performance and a wide angle of view.

In the observation optical system according to each example, EP is an eye point (exit plane). LCD is a display panel. The display panel LCD includes a liquid crystal element, an organic EL, or the like. The display panel LCD is disposed so that the image display plane (display plane) faces the observation optical system side. An optical path brancher (branching unit) DP includes a dichroic prism, branches an optical path, and is disposed between the display panel LCD and the first lens L1. An optical element other than the dichroic prism may be used for the optical path brancher DP. For example, a half-mirror may be used for the optical path brancher DP. The optical path brancher DP serves to transmit light from the display panel LCD to guide it to the pupil of the user, and reflects light from the pupil of the user (visual line). Thereby, the visual line of the user is detectable.

For the observation optical system according to each example, the distortion and lateral chromatic aberration among various aberrations may be corrected by electrical image processing. Thereby, it is possible to satisfactorily correct the chromatic aberration, curvature of field, etc. while achieving a high imaging magnification and a size reduction of the entire lens diameter.

FIGS. 2, 4, 6, 8, 10, 12, 14, 16, 18, 20, and 22 are aberration diagrams of the observation optical systems according to Examples 1 to 11, respectively. Each aberration diagram shows a diopter of $-1$ m$^{-1}$ (standard diopter).

The spherical aberration diagram shows spherical aberration amounts for the d-line (wavelength 587.6 nm) and the F-line (wavelength 486.1 nm). In the astigmatism diagram, M represents an astigmatism amount on a meridional image plane, and S represents an astigmatism amount on a sagittal image plane. The distortion diagram shows a distortion amount for the d-line. The chromatic aberration diagram shows a chromatic aberration amount for the F-line.

A description will now be given of a characteristic configuration of the optical system according to each example.

In the observation optical system according to each example, an absolute value of a radius of curvature of a lens surface on the observation side of the first lens L1 is smaller than an absolute value of a radius of curvature of a lens surface on the display panel side of the first lens.

The observation optical system according to each example satisfies the following inequalities (1) and (2). Herein, d1 is a distance from a display plane of the display panel LCD to the lens surface on the display panel side of the first lens L1, f is a focal length of the observation optical system at the standard diopter. d23 is a distance on an optical axis from a lens surface on the observation side of the second lens L2 to a lens surface on the display panel side of the third lens L3. d12 is a distance on the optical axis from the lens surface on the observation side of the first lens L1 to a lens surface on the display panel side of the second lens L2.

$$0.5 < d1/f < 2.0 \qquad (1)$$

$$0.0 < d23/d12 < 0.5 \qquad (2)$$

The inequality (1) defines a relationship between the distance from the display panel LCD to the lens surface on the display panel side of the first lens L1 and the focal length of the observation optical system at the standard diopter. Satisfying the inequality (1) can correct various aberrations such as the spherical aberration, curvature of field, and astigmatism, while securing a sufficient space for the optical path brancher DP and a wide angle of view. If the focal length of the observation optical system becomes shorter and the value is higher than the upper limit in the inequality (1), the various aberrations such as the spherical aberration, curvature of field, and astigmatism cannot be satisfactorily corrected. If the value is lower than the lower limit in the inequality (1), it becomes difficult to secure the sufficient space for the optical path brancher DP.

The inequality (2) defines a relationship between the distance on the optical axis from the lens surface on the observation side of the second lens L2 to the lens surface on the display panel side of the third lens L3 and the distance on the optical axis from the lens surface on the observation side of the first lens L1 to the lens surface on the display panel side of the second lens L2. Satisfying the inequality (2) can correct various aberrations, such as the spherical aberration, curvature of field, and astigmatism, while securing a wide angle of view. If the distance on the optical axis from the lens surface on the observation side of the first lens L1 to the lens surface on the display panel side of the second lens L2 becomes shorter and the value is higher than the upper limit in the inequality (2), it becomes difficult to suppress the curvature of field and spherical aberration. When the distance on the optical axis from the lens surface on the observation side of the first lens L1 to the lens surface on the display panel side of the second lens L2 becomes longer and the value is lower than the lower limit in the inequality (2), it becomes difficult to suppress a lens diameter when the angle of view is made wider.

The numerical ranges of the inequalities (1) and (2) may be set to those of the following inequalities (1a) and (2a):

$$0.51 < d1/f < 1.70 \qquad (1a)$$

$$0.01 < d23/d12 < 0.40 \qquad (2a)$$

The numerical ranges of the inequalities (1) and (2) may be set to those of the following inequalities (1b) and (2b):

$$0.51 < d1/f < 1.40 \qquad (1b)$$

$$0.02 < d23/d12 < 0.30 \qquad (2b)$$

A description will now be given of conditions which the observation optical system according to each example may satisfy. The observation optical system according to each example may satisfy one or more of the following inequalities (3) to (17). Herein, f1 is a focal length of the first lens L1. f3 is a focal length of the third lens L3. G1R1 is the radius of curvature of the lens surface on the display panel side of the first lens L1. G1R2 is the radius of curvature of the lens surface on the observation side of the first lens L1. G2R1 is a radius of curvature of the lens surface on the display panel side of the second lens L2. G2R2 is a radius of curvature of a lens surface on the observation side of the second lens L2. G3R1 is a radius of curvature of a lens surface on the display panel side of the third lens L3. G3R2 is a radius of curvature of the lens surface on the observation side of the third lens L3. Ndg1 is a refractive index of the first lens L1 for the d-line. Ndg2 is a refractive index of the second lens L2 for the d-line. Ndg3 is a refractive index of the third lens L3 for the d-line. vdg1 is an Abbe number of the first lens L1 for the d-line. vdg2 is an Abbe number of the second lens for the d-line. vdg3 is an Abbe number of the third lens L3 for the d-line. gt2 is a distance on the optical axis from the lens surface on the display panel side of the second lens L2 to the lens surface on the observation side of the second lens L2. Ndg0 is a refractive index of the optical path brancher DP for the d-line. vdg0 is an Abbe number of the optical path brancher DP for the d-line.

$$0.55 < f1/f < 2.00 \quad (3)$$

$$0.8 < f3/f1 < 2.0 \quad (4)$$

$$1.3 < (G1R2 + G2R1)/(G1R2 - G2R1) < 15.0 \quad (5)$$

$$0.05 < (G1R1 + G1R2)/(G1R1 - G1R2) < 2.00 \quad (6)$$

$$-10.0 < (G2R1 + G2R2)/(G2R1 - G2R2) < -0.3 \quad (7)$$

$$0.1 < (G3R1 + G3R2)/(G3R1 - G3R2) < 3.0 \quad (8)$$

$$1.5 < Ndg1 < 2.0 \quad (9)$$

$$1.6 < Ndg2 < 1.8 \quad (10)$$

$$1.5 < Ndg3 < 2.0 \quad (11)$$

$$30 < vdg1 < 70 \quad (12)$$

$$18 < vdg2 < 30 \quad (13)$$

$$30 < vdg3 < 70 \quad (14)$$

$$0.02 < gt2/f < 0.15 \quad (15)$$

$$1.55 < Ndg0 < 2.00 \quad (16)$$

$$33 < vdg0 < 75 \quad (17)$$

The inequality (3) defines a relationship between the focal length of the first lens and the focal length of the observation optical system. Satisfying the inequality (3) can suppress the curvature of field and longitudinal (axial) chromatic aberration of the observation optical system, and maintain a high magnification and a sufficient distance from the display panel to the lens surface on the display panel side of the first lens L1. If the power of the first lens L1 becomes weaker and the value is higher than the upper limit in the inequality (3), a high magnification scheme becomes difficult. In addition, since the principal point position of the observation optical system moves to the observation side, it becomes difficult to secure the distance from the display panel LCD to the lens surface on the display panel side of the first lens L1. If the value is lower than the lower limit in the inequality (3), it becomes difficult to suppress the curvature of field and longitudinal chromatic aberration of the observation optical system.

The inequality (4) defines a relationship between the focal length of the third lens L3 and the focal length of the first lens L1. Satisfying the inequality (4) can maintain a high magnification, secures a sufficient distance from the display panel to the lens surface on the display panel side of the first lens L1, and satisfy the telecentricity on the light incident side (panel display plane side) of the observation optical system. If the power of the first lens L1 becomes weaker and the value is higher than the upper limit in the inequality (4), a high magnification scheme becomes difficult. In addition, since the principal point position of the observation optical system moves to the observation side, it becomes difficult to secure the distance from the display panel LCD to the lens surface on the display panel side of the first lens L1. When the value is lower than the lower limit in the inequality (4), the light emitted from the display panel LCD is significantly bent by the first lens L1. In order to introduce the light to the observation side, a large exit angle from the display panel LCD is necessary but this weakens the telecentricity. Since the display panel LCD causes uneven coloring and decreases a light amount depending on the exit angle of a light ray, the observation optical system may be telecentric and have a small exit angle from the display panel LCD.

The inequality (5) defines shape factors of the lens surface on the observation side of the first lens L1 and the lens surface on the display panel side of the second lens L2. Satisfying the inequality (5) can maintain a high magnification, secure a sufficient distance from the display panel LCD to the lens surface on the display panel side of the first lens L1, and suppress the curvature of field and the longitudinal chromatic aberration. If the power of the first lens L1 becomes weaker and the value is higher than the upper limit in the inequality (5), a high magnification scheme becomes difficult. In addition, since the principal point position of the observation optical system moves to the observation side, it becomes difficult to secure the distance from the display panel LCD to the lens surface on the display panel side of the first lens L1. If the value is lower than the lower limit in the inequality (5), it becomes difficult to suppress the curvature of field and longitudinal chromatic aberration of the observation optical system.

The inequality (6) defines shape factors of the lens surface on the display panel side of the first lens L1 and the lens surface on the observation side of the first lens L1. Satisfying the inequality (6) can maintain a high magnification, secure a sufficient distance from the display panel LCD to the lens surface on the display panel side of the first lens L1, and suppress the curvature of field and coma of the observation optical system. If the power on the lens surface side of the observation surface side of the first lens L1 becomes stronger and the value is higher than the upper limit in the inequality (6), it becomes difficult to suppress the spherical aberration and curvature of field. When the power on the observation side of the first lens L1 becomes weaker and the value is lower than the lower limit in the inequality (6), the light beam emitted from the display panel LCD is significantly bent by the first lens L1. In order to introduce the light to the observation side, a large exit angle from the display panel LCD is necessary and this weakens the telecentricity. Since the display panel LCD causes uneven coloring and decreases the light amount depending on the exit angle of a light ray, the observation optical system may be telecentric and have a small exit angle from the display panel LCD.

The inequality (7) defines shape factors of the lens surface on the display panel side of the second lens L2 and the lens surface on the observation side of the second lens L2. If the power on the lens surface side of the display panel side of the second lens L2 becomes stronger and the value is higher than the upper limit in the inequality (7), it becomes difficult to suppress the distortion and astigmatism. If the power on the lens surface side of the display panel side of the second lens becomes weaker and the value is lower than the lower limit in the inequality (7), a high magnification scheme becomes difficult. In addition, since the principal point position of the observation optical system moves to the observation side, it becomes difficult to secure the distance from the display panel LCD to the lens surface on the display panel side of the first lens L1.

The inequality (8) defines shape factors on the display panel side of the lens surface of the third lens L3 and the lens surface on the observation side of the third lens L3. Satisfying the inequality (8) can maintains a wide angle of view, and sufficiently suppress various aberrations such as the spherical aberration, curvature of field, and astigmatism. If the power of the lens surface on the observation side of the third lens L3 becomes stronger and the value is higher than the upper limit in the inequality (8), it becomes difficult to suppress the curvature of field and coma. When the power on the observation side of the third lens L3 becomes weaker and the value is lower than the lower limit in the inequality (8), the observation magnification of the observation optical system lowers.

The inequality (9) defines the refractive index of the first lens L1 for the d-line. Satisfying the inequality (9) can suppress the aberration of the observation optical system. If the inequality (9) is not satisfied, the curvature of the first lens L1 becomes tight, and it becomes difficult to suppress the spherical aberration and curvature of field.

The inequality (10) defines the refractive index of the second lens L2 for the d-line. Satisfying the inequality (10) can suppress the aberration of the observation optical system. If the inequality (10) is not satisfied, the curvature of the lens surface on the display panel side of the second lens L2 becomes tight, and it becomes difficult to suppress the spherical aberration and curvature of field.

The inequality (11) defines the refractive index of the third lens L3 for the d-line. Satisfying the inequality (11) can suppress the aberration of the observation optical system. If the inequality (11) is not satisfied, the curvature of the third lens L3 becomes tight, and it becomes difficult to suppress the spherical aberration and curvature of field.

The inequality (12) defines the Abbe number of the first lens L1 for the d-line. Satisfying the inequality (12) can correct various aberrations such as the longitudinal and lateral chromatic aberrations. If the inequality (12) is not satisfied, it becomes difficult to suppress the longitudinal and lateral chromatic aberration.

The inequality (13) defines the Abbe number of the second lens L2 for the d-line. Satisfying the inequality (13) can correct various aberrations such as the longitudinal and lateral chromatic aberrations. If the inequality (13) is not satisfied, it becomes difficult to suppress the longitudinal and lateral chromatic aberrations.

The inequality (14) defines the Abbe number of the third lens L3 for the d-line. Satisfying the inequality (14) can correct various aberrations such as the longitudinal and lateral chromatic aberrations. If the inequality (14) is not satisfied, it becomes difficult to suppress the longitudinal and lateral chromatic aberrations.

The inequality (15) defines a relationship between the distance on the optical axis from the lens surface on the display panel side of the second lens L2 to the lens surface on the observation side of the second lens L2 and the focal length of the observation optical system. When the distance on the optical axis from the lens surface on the display panel side of the second lens L2 to the lens surface on the observation side of the second lens L2 becomes longer and the value is higher than the upper limit in the inequality (15), it becomes difficult to restrain the lens diameter of the observation optical system. When the distance on the optical axis from the lens surface on the display panel side of the second lens L2 to the lens surface on the observation side of the second lens L2 becomes shorter and the value is lower than the lower limit in the inequality (15), it becomes difficult to secure the edge and the center thicknesses of the lens.

The inequality (16) defines the refractive index of the optical path brancher DP for the d-line. If the value is higher than the upper limit in the inequality (16), it becomes difficult to process the prism disposed in the observation optical system. When the power of the observation optical system becomes weaker and the value is lower than the lower limit in the inequality (16), the observation magnification of the observation optical system lowers.

The inequality (17) defines the Abbe number of the optical path brancher for the d-line. Satisfying the inequality (17) can correct various aberrations such as the longitudinal and lateral chromatic aberrations. If the inequality (17) is not satisfied, it becomes difficult to suppress the longitudinal and lateral chromatic aberrations.

The numerical ranges of the inequalities (3) to (17) may be set to those of the following inequalities (3a) to (17a):

$$0.57 < f1/f < 1.70 \tag{3a}$$

$$0.85 < f3/f1 < 1.90 \tag{4a}$$

$$1.4 < (G1R2+G2R1)/(G1R2-G2R1) < 13.0 \tag{5a}$$

$$0.08 < (G1R1+G1R2)/(G1R1-G1R2) < 1.60 \tag{6a}$$

$$-8.0 < (G2R1+G2R2)/(G2R1-G2R2) < -0.5 \tag{7a}$$

$$0.15 < (G3R1+G3R2)/(G3R1-G3R2) < 2.40 \tag{8a}$$

$$1.51 < Ndg1 < 1.95 \tag{9a}$$

$$1.61 < Ndg2 < 1.76 \tag{10a}$$

$$1.51 < Ndg3 < 1.95 \tag{11a}$$

$$32 < vdg1 < 66 \tag{12a}$$

$$19 < vdg2 < 28 \tag{13a}$$

$$33 < vdg3 < 66 \tag{14a}$$

$$0.03 < gt2/f < 0.14 \tag{15a}$$

$$1.57 < Ndg0 < 1.95 \tag{16a}$$

$$35 < vdg0 < 71 \tag{17a}$$

The numerical ranges of the inequalities (3) to (17) may be set to those of the following inequalities (3b) to (17b):

$$0.59 < f1/f < 1.40 \tag{3b}$$

$$0.90 < f3/f1 < 1.80 \tag{4b}$$

$$1.5 < (G1R2+G2R1)/(G1R2-G2R1) < 11.0 \tag{5b}$$

$$0.11 < (G1R1+G1R2)/(G1R1-G1R2) < 1.20 \tag{6b}$$

$$-6.0 < (G2R1+G2R2)/(G2R1-G2R2) < -0.7 \tag{7b}$$

$$0.2 < (G3R1+G3R2)/(G3R1-G3R2) < 1.8 \tag{8b}$$

$$1.52 < Ndg1 < 1.89 \tag{9b}$$

$$1.62 < Ndg2 < 1.72 \tag{10b}$$

$$1.52 < Ndg3 < 1.89 \tag{11b}$$

$$34 < vdg1 < 62 \tag{12b}$$

$$20 < vdg2 < 26 \tag{13b}$$

$$36 < vdg3 < 62 \tag{14b}$$

$$0.04 < gt2/f < 0.13 \tag{15b}$$

$$1.59 < Ndg0 < 1.90 \tag{16b}$$

$$37 < vdg0 < 67 \tag{17b}$$

A detailed description will now be given of the optical system according to each example.

Each of the observation optical systems according to Examples 1 to 6, 10, and 11 includes, in order from the display panel side to the observation side, a first lens L1 having a positive refractive power, a second lens L2 having a negative refractive power, and a third lens L3 having a positive refractive power.

Each of the observation optical systems according to Examples 7 to 9 includes, in order from the display panel side to the observation side, a first lens L1 having a positive refractive power, a second lens L2 having a negative refractive power, a third lens L3 having a positive refractive power, and a fourth lens L4 having a positive refractive power.

Numerical Examples 1 to 11 corresponding to Examples 1 to 11 will be shown below.

In each numerical example, a diagonal length of the image (screen) display means a diagonal length of a display panel, which is twice the maximum image height of the object plane (display panel).

In the surface data of each numerical example, r represents a radius of curvature of each optical surface, and d (mm) represents an axial distance (distance on the optical axis) between an m-th plane and an (m+1)-th plane, where m is a surface number counted from the display panel side. nd represents a refractive index of each optical element for the d-line, and vd represents an Abbe number of the optical element. The Abbe number vd of a certain material is expressed as follows:

$$vd = (Nd-1)/(NF-NC)$$

where Nd, NF, and NC are refractive indexes for the d-line (587.6 nm), F-line (486.1 nm), and C-line (656.3 nm) in the Fraunhofer line.

In each numerical example, [mm] is used as the unit of the described length unless otherwise specified. Since the observation optical system can obtain the same optical performance even if it is proportionally enlarged or reduced, the unit is not limited to [mm] and another proper unit may be used.

When the optical surface is an aspherical surface, a * symbol is attached to the right side of the surface number. In the aspherical shape, X is a displacement amount from the surface vertex in the optical axis direction, h is a height from the optical axis in the direction orthogonal to the optical axis, R is a paraxial radius of curvature, K is a conical constant, A2, A4, A6, A8, and A10 are aspherical coefficients of each order:

$$X = (h^2/R)/[1+\{1-(1+K)(h/R)^2\}]^{1/2} + A2 \times h^2 + A4 \times h^4 + A6 \times h^6 + A8 \times h^8 + A10 \times h^{10}$$

In addition, "e±XX" in each aspherical coefficient means "×10^{±XX}."

Numerical Example 1

AT STANDARD DIOPTER Focal Length: f=18.7 Pupil Diameter: 10 Image display diagonal length: 6.434

| Surface Data | | | | |
|---|---|---|---|---|
| Surface No. | r | d | nd | vd |
| 1 | ∞ | 0.70 | 1.52100 | 65.1 |
| 2 | ∞ | 2.40 | | |
| 3 | ∞ | 7.50 | 1.83400 | 37.2 |
| 4 | ∞ | (Variable) | | |
| 5 | 45.231 | 4.65 | 1.76802 | 49.2 |
| 6* | −15.489 | 3.49 | | |
| 7* | −4.014 | 1.20 | 1.63550 | 23.9 |
| 8* | −7.629 | 0.55 | | |
| 9 | 151.752 | 6.87 | 1.76802 | 49.2 |
| 10* | −14.490 | (Variable) | | |
| 11 | ∞ | 1.00 | 1.49171 | 57.4 |
| 12 | ∞ | 23.00 | | |
| 13 | (Eye Point) | | | |

Aspheric Data

6th Surface K=−6.66748e−001 A 4=−2.85417e−005 A 6=1.39887e−006 A 8=−1.10652e−008 A10=2.81105e−011

7th Surface K=−2.18343e+000 A 4=1.54046e−004 A 6=−1.65834e−006 A 8=−4.30312e−008 A10=3.85331e−010

8th Surface K=−5.65588e+000 A 4=7.37605e−004 A 6=−1.02719e−005 A 8=6.14376e−008 A10=−1.34191e−010

10th Surface K=−7.64153e−001 A 4=3.04449e−005 A 6=−4.75055e−007 A 8=4.20704e−009 A10=−1.22627e−011

| VARIABLE INTERVAL | | | | |
|---|---|---|---|---|
| | 0 m-1 | −1 | −5 | +2 |
| d4 | 2.55 | 2.19 | 1.07 | 3.23 |
| d10 | 1.30 | 1.65 | 2.78 | 0.62 |

Numerical Example 2

AT STANDARD DIOPTER Focal Length: f=17.3 Pupil Diameter: 10 Image display diagonal length: 6.434

| Surface Data | | | | |
|---|---|---|---|---|
| Surface No. | r | d | nd | vd |
| 1 | ∞ | 0.70 | 1.52100 | 65.1 |
| 2 | ∞ | 2.00 | | |
| 3 | ∞ | 8.50 | 1.83400 | 37.2 |
| 4 | ∞ | (Variable) | | |
| 5 | 32.488 | 6.22 | 1.85135 | 40.1 |
| 6* | −14.808 | 3.68 | | |
| 7* | −6.818 | 1.42 | 1.65100 | 21.5 |
| 8* | −112.547 | 0.15 | | |
| 9 | 131.272 | 6.37 | 1.85135 | 40.1 |
| 10* | −13.950 | (Variable) | | |
| 11 | ∞ | 1.00 | 1.49171 | 57.4 |
| 12 | ∞ | 23.00 | | |
| 13 | (Eye Point) | | | |

Aspheric Data

6th Surface K=−5.17963e−001 A4=1.31147e−004 A6=−9.49493e−007 A8=7.11126e−009 A10=−2.06714e−011

7th Surface K=−2.30355e+000 A4=−4.79553e−005 A6=−4.11730e−007 A8=4.18329e−009 A10=−9.10282e−012

8th Surface K=−2.29196e+002 A4=9.77074e−005 A6=−6.23395e−007 A8=−5.31801e−011 A10=6.30220e−012

10th Surface K=−2.73927e+000 A4=−4.98063e−006 A6=−4.94289e−007 A8=4.69850e−009 A10=−1.20091e−011

| VARIABLE INTERVAL | | | | |
|---|---|---|---|---|
| | 0 m-1 | −1 | −5 | +2 |
| d4 | 2.68 | 2.43 | 1.07 | 3.61 |
| d10 | 2.61 | 3.01 | 4.29 | 1.44 |

Numerical Example 3

AT STANDARD DIOPTER Focal Length: f=20.9 Pupil Diameter: 10 Image display diagonal length: 6.434

| Surface Data | | | | |
|---|---|---|---|---|
| Surface No. | r | d | nd | vd |
| 1 | ∞ | 0.70 | 1.52100 | 65.1 |
| 2 | ∞ | 2.40 | | |
| 3 | ∞ | 11.00 | 1.51633 | 64.1 |
| 4 | ∞ | (Variable) | | |
| 5 | 70.050 | 5.00 | 1.53500 | 55.7 |
| 6* | −10.453 | 2.24 | | |
| 7* | −8.090 | 1.47 | 1.63550 | 23.9 |
| 8* | −30.489 | 0.20 | | |
| 9 | 565.772 | 5.30 | 1.53500 | 55.7 |
| 10* | −11.482 | (Variable) | | |
| 11 | ∞ | 1.00 | 1.49171 | 57.4 |
| 12 | ∞ | 23.00 | | |
| 13 | (Eye Point) | | | |

Aspheric Data

6th Surface K=−1.14236e+000 A4=7.88210e−005 A6=−6.98908e−007 A8=6.72781e−009 A10=3.25984e−011

7th Surface K=−7.73767e−001 A4=−1.65804e−004 A6=3.40985e−006 A8=−5.33102e−008 A10=4.56325e−010

8th Surface K=1.10047e+000 A4=−1.61563e−004 A6=1.59586e−006 A8=−2.23675e−008 A10=1.59401e−010

10th Surface K=−5.64372e−001 A4=2.41444e−005 A6=9.78734e−007 A8=−3.91803e−009 A10=−1.07217e−011

| VARIABLE INTERVAL | | | | |
|---|---|---|---|---|
| | 0 m-1 | −1 | −5 | +2 |
| d4 | 2.80 | 2.44 | 1.07 | 3.97 |
| d10 | 2.61 | 3.01 | 4.29 | 1.44 |

Numerical Example 4

AT STANDARD DIOPTER Focal Length: f=19.4 Pupil Diameter: 10 Image display diagonal length: 6.434

| Surface Data | | | | |
|---|---|---|---|---|
| Surface No. | r | d | nd | vd |
| 1 | ∞ | 0.70 | 1.52100 | 65.1 |
| 2 | ∞ | 2.40 | | |
| 3 | ∞ | 5.50 | 1.83400 | 37.2 |
| 4 | ∞ | (Variable) | | |
| 5 | 53.212 | 4.23 | 1.76802 | 49.2 |
| 6* | −17.471 | 3.64 | | |
| 7* | −6.264 | 1.47 | 1.63550 | 23.9 |
| 8* | −17.286 | 0.20 | | |
| 9 | −978.513 | 6.33 | 1.76802 | 49.2 |
| 10* | −13.131 | (Variable) | | |
| 11 | ∞ | 1.00 | 1.49171 | 57.4 |
| 12 | ∞ | 23.00 | | |
| 13 | (Eye Point) | | | |

Aspheric Data

6th Surface K=−1.77022e−001 A4=1.46611e−005 A6=−2.33559e−007 A8=8.98377e−009 A10=−4.50295e−011

7th Surface K=−1.48356e+000 A4=3.08907e−005 A6=−2.68254e−006 A8=2.86950e−008 A10=−1.19054e−010

8th Surface K=−1.00098e+001 A4=1.17321e−004 A6=−1.03184e−006 A8=1.13551e−009 A10=2.52839e−011

10th Surface K=−8.57586e−001 A4=2.88196e−005 A6=−4.48100e−007 A8=4.84736e−009 A10=−2.05834e−011

| VARIABLE INTERVAL | | | | |
|---|---|---|---|---|
| | 0 m-1 | −1 | −5 | +2 |
| d4 | 4.60 | 4.24 | 2.92 | 5.72 |
| d10 | 2.61 | 3.01 | 4.29 | 1.44 |

Numerical Example 5

AT STANDARD DIOPTER Focal Length: f=17.3 Pupil Diameter: 10 Image display diagonal length: 6.434

| Surface Data | | | | |
|---|---|---|---|---|
| Surface No. | r | d | nd | vd |
| 1 | ∞ | 0.70 | 1.52100 | 65.1 |
| 2 | ∞ | 1.40 | | |
| 3 | ∞ | 7.50 | 1.83400 | 37.2 |
| 4 | ∞ | (Variable) | | |
| 5 | 38.725 | 6.19 | 1.76802 | 49.2 |
| 6* | −12.483 | 3.78 | | |
| 7* | −6.314 | 1.47 | 1.63550 | 23.9 |
| 8* | −36.874 | 0.20 | | |
| 9 | 142.426 | 6.67 | 1.76802 | 49.2 |
| 10* | −12.969 | (Variable) | | |
| 11 | ∞ | 1.00 | 1.49171 | 57.4 |
| 12 | ∞ | 23.00 | | |
| 13 | (Eye Point) | | | |

Aspheric Data

6th Surface K=−6.29498e−001 A4=1.19468e−004 A6=−4.49758e−007 A8=8.06285e−010 A10=4.56492e−012

7th Surface K=−1.47340e+000 A4=1.85691e−004 A6=−3.51354e−006 A8=1.54064e−008 A10=−3.68192e−012

8th Surface K=−9.42027e+000 A4=1.27913e−004 A6=−9.21440e−007 A8=−2.65348e−010 A10=7.48724e−012

10th Surface K=−1.26617e+000 A4=6.28629e−005 A6=−9.49756e−007 A8=6.89539e−009 A10=−1.46285e−011

| VARIABLE INTERVAL | | | | |
|---|---|---|---|---|
|  | 0 m-1 | −1 | −5 | +2 |
| d4 | 2.68 | 2.43 | 1.07 | 3.61 |
| d10 | 2.61 | 3.01 | 4.29 | 1.44 |

Numerical Example 6

AT STANDARD DIOPTER Focal Length: f=18.7 Pupil Diameter: 10 Image display diagonal length: 6.434

| Surface Data | | | | |
|---|---|---|---|---|
| Surface No. | r | d | nd | vd |
| 1 | ∞ | 0.70 | 1.52100 | 65.1 |
| 2 | ∞ | 2.40 | | |
| 3 | ∞ | 7.50 | 1.83400 | 37.2 |
| 4 | ∞ | (Variable) | | |
| 5 | 57.475 | 4.45 | 1.76802 | 49.2 |
| 6* | −14.399 | 3.52 | | |
| 7* | −5.527 | 2.20 | 1.63550 | 23.9 |
| 8* | −16.114 | 0.15 | | |
| 9 | 189.354 | 6.00 | 1.76802 | 49.2 |
| 10* | −13.731 | (Variable) | | |
| 11 | ∞ | 1.00 | 1.49171 | 57.4 |
| 12 | ∞ | 23.00 | | |
| 13 | (Eye Point) | | | |

Aspheric Data
 6th Surface K=−6.90825e−001 A4=8.38523e−005 A6=−6.11664e−007 A8=7.67392e−009 A10=−4.11453e−011
 7th Surface K=−1.90508e+000 A4=3.96382e−005 A6=−1.65188e−006 A8=−8.19135e−009 A10=9.04048e−011
 8th Surface K=−7.66349e+000 A4=2.88263e−004 A6=−3.08349e−006 A8=1.31547e−008 A10=−1.74846e−011
 10th Surface K=−1.83793e+000 A4=−1.51567e−005 A6=−4.27702e−007 A8=4.02270e−009 A10=−1.15184e−011

| VARIABLE INTERVAL | | | | |
|---|---|---|---|---|
|  | 0 m-1 | −1 | −5 | +2 |
| d4 | 2.72 | 2.37 | 1.07 | 3.55 |
| d10 | 1.45 | 1.80 | 3.09 | 0.62 |

Numerical Example 7

AT STANDARD DIOPTER Focal Length: f=16.7 Pupil Diameter: 10 Image display diagonal length: 6.434

| Surface Data | | | | |
|---|---|---|---|---|
| Surface No. | r | d | nd | vd |
| 1 | ∞ | 0.70 | 1.52100 | 65.1 |
| 2 | ∞ | 2.40 | | |
| 3 | ∞ | 8.00 | 1.83400 | 37.2 |
| 4 | ∞ | (Variable) | | |
| 5 | 26.560 | 9.25 | 1.85135 | 40.1 |
| 6* | −11.463 | 2.78 | | |
| 7* | −5.419 | 1.48 | 1.65100 | 21.5 |
| 8* | −559.787 | 0.30 | | |
| 9 | 64.096 | 4.96 | 1.85135 | 40.1 |
| 10* | −16.116 | 0.38 | | |
| 11* | −330.547 | 1.50 | 1.85135 | 40.1 |
| 12 | −87.784 | (Variable) | | |
| 13 | ∞ | 1.00 | 1.49171 | 57.4 |
| 14 | ∞ | 23.00 | | |
| 15 | (Eye Point) | | | |

Aspheric Data
 6th Surface K=−8.96739e−001 A4=1.40579e−004 A6=−1.40304e−007 A8=−1.20332e−009 A10=4.37568e−012
 7th Surface K=−1.72726e+000 A4=2.86825e−004 A6=−2.54542e−006 A8=1.07202e−008 A10=−1.64392e−011
 8th Surface K=−2.00703e+001 A4=7.06128e−005 A6=−2.04709e−007 A8=1.03566e−010 A10=7.04374e−013
 10th Surface K=−4.88826e+000 A4=1.02869e−004 A6=−1.00942e−006 A8=3.92627e−009 A10=−3.22191e−012
 11th Surface K=0.00000e+000 A4=1.40836e−009 A6=−1.47238e−007 A8=8.72409e−010

| VARIABLE INTERVAL | | | | |
|---|---|---|---|---|
|  | 0 m-1 | −1 | −5 | +2 |
| d4 | 2.60 | 2.36 | 1.07 | 3.46 |
| d12 | 2.61 | 3.01 | 4.29 | 1.44 |

Numerical Example 8

AT STANDARD DIOPTER Focal Length: f=19.6 Pupil Diameter: 10 Image display diagonal length: 6.434

| Surface Data | | | | |
|---|---|---|---|---|
| Surface No. | r | d | nd | vd |
| 1 | ∞ | 0.70 | 1.52100 | 65.1 |
| 2 | ∞ | 2.00 | | |
| 3 | ∞ | 15.00 | 1.83400 | 37.2 |
| 4 | ∞ | (Variable) | | |
| 5 | 26.960 | 6.81 | 1.88202 | 37.2 |
| 6* | −20.302 | 4.41 | | |
| 7* | −6.551 | 1.50 | 1.65100 | 21.5 |
| 8* | −49.760 | 0.30 | | |
| 9 | 31.260 | 4.87 | 1.53100 | 56.0 |
| 10* | −13.846 | 0.40 | | |
| 11* | −316.353 | 1.50 | 1.53100 | 56.0 |
| 12 | −60.253 | (Variable) | | |
| 13 | ∞ | 1.00 | 1.49171 | 57.4 |
| 14 | ∞ | 23.00 | | |
| 15 | (Eye Point) | | | |

Aspheric Data
 6th Surface K=−3.30456e−001 A4=6.13001e−005 A6=−7.08532e−008 A8=−8.15267e−010 A10=5.59645e−012

7th Surface K=−1.31789e+000 A4=3.64324e−004 A6=−3.19790e−006 A8=1.52536e−008 A10=−2.50693e−011

8th Surface K=7.74508e+000 A4=8.92913e−005 A6=−5.69190e−007 A8=−4.29620e−010 A10=1.40568e−011

10th Surface K=−4.27201e+000 A4=1.60683e−004 A6=−8.25502e−007 A8=4.85238e−009 A10=−2.05050e−011

11th Surface K=0.00000e+000 A4=1.26889e−010 A6=−3.88095e−008 A8=−1.50250e−009

| VARIABLE INTERVAL | | | | |
|---|---|---|---|---|
| | 0 m−1 | −1 | −5 | +2 |
| d4 | 2.76 | 2.39 | 1.07 | 3.88 |
| d12 | 2.61 | 3.01 | 4.29 | 1.44 |

Numerical Example 9

AT STANDARD DIOPTER Focal Length: f=19.4 Pupil Diameter: 10 Image display diagonal length: 6.434

| Surface Data | | | | |
|---|---|---|---|---|
| Surface No. | r | d | nd | vd |
| 1 | ∞ | 0.70 | 1.52100 | 65.1 |
| 2 | ∞ | 2.40 | | |
| 3 | ∞ | 5.50 | 1.83400 | 37.2 |
| 4 | ∞ | (Variable) | | |
| 5 | 80.942 | 4.31 | 1.76802 | 49.2 |
| 6* | −17.118 | 3.84 | | |
| 7* | −7.014 | 1.50 | 1.63550 | 23.9 |
| 8* | −29.619 | 0.30 | | |
| 9 | 33.202 | 6.80 | 1.53500 | 55.7 |
| 10* | −12.491 | 0.40 | | |
| 11* | −231.468 | 2.20 | 1.53500 | 55.7 |
| 12 | −38.773 | (Variable) | | |
| 13 | ∞ | 1.00 | 1.49171 | 57.4 |
| 14 | ∞ | 23.00 | | |
| 15 | (Eye Point) | | | |

Aspheric Data

6th Surface K=−3.40902e−001 A4=−8.45938e−006 A6=−7.30356e−007 A8=1.19537e−008 A10=−4.78498e−011

7th Surface K=−8.34256e−001 A4=−3.07734e−005 A6=−5.02200e−007 A8=1.44453e−008 A10=−2.23447e−011

8th Surface K=1.61326e+000 A4=9.82052e−005 A6=−8.14780e−007 A8=−4.37799e−009 A10=4.12233e−011

10th Surface K=−9.02152e−001 A4=4.56397e−005 A6=1.40184e−007 A8=4.52440e−009 A10=−2.34725e−011

11th Surface K=0.00000e+000 A4=3.05411e−010 A6=8.29368e−011 A8=−1.89591e−010

| VARIABLE INTERVAL | | | | |
|---|---|---|---|---|
| | 0 m−1 | −1 | −5 | +2 |
| d4 | 2.76 | 2.40 | 1.07 | 3.87 |
| d12 | 2.61 | 3.01 | 4.29 | 1.44 |

Numerical Example 10

AT STANDARD DIOPTER Focal Length: f=18.7 Pupil Diameter: 10 Image display diagonal length: 6.434

| Surface Data | | | | |
|---|---|---|---|---|
| Surface No. | r | d | nd | vd |
| 1 | ∞ | 0.70 | 1.52100 | 65.1 |
| 2 | ∞ | 1.811 | | |
| 3 | ∞ | 7.50 | 1.60311 | 37.2 |
| 4 | ∞ | (Variable) | | |
| 5 | 57.475 | 4.45 | 1.76802 | 49.2 |
| 6 | −14.399 | 3.52 | | |
| 7* | −5.527 | 2.20 | 1.63550 | 23.9 |
| 8* | −16.114 | 0.15 | | |
| 9 | 189.354 | 6.00 | 1.76802 | 49.2 |
| 10* | −13.731 | (Variable) | | |
| 11 | ∞ | 1.00 | 1.49171 | 57.4 |
| 12 | ∞ | 23.00 | | |
| 13 | (Eye Point) | | | |

Aspheric Data

6th Surface K=−6.90825e−001 A4=8.38523e−005 A6=−6.11664e−007 A8=7.67392e−009 A10=−4.11453e−011

7th Surface K=−1.90508e+000 A4=3.96382e−005 A6=−1.65188e−006 A8=−8.19135e−009 A10=9.04048e−011

8th Surface K=−7.66349e+000 A4=2.88263e−004 A6=−3.08349e−006 A8=1.31547e−008 A10=−1.74846e−011

10th Surface K=−1.83793e+000 A4=−1.51567e−005 A6=−4.27702e−007 A8=4.02270e−009 A10=−1.15184e−011

| VARIABLE INTERVAL | | | | |
|---|---|---|---|---|
| | 0 m−1 | −1 | −5 | +2 |
| d4 | 2.72 | 2.37 | 1.07 | 3.55 |
| d10 | 1.45 | 1.80 | 3.09 | 0.62 |

Numerical Example 11

AT STANDARD DIOPTER Focal Length: f=18.7 Pupil Diameter: 10 Image display diagonal length: 6.434

| Surface Data | | | | |
|---|---|---|---|---|
| Surface No. | r | d | nd | vd |
| 1 | ∞ | 0.70 | 1.52100 | 65.1 |
| 2 | ∞ | 2.13 | | |
| 3 | ∞ | 7.50 | 1.71995 | 37.2 |
| 4 | ∞ | (Variable) | | |
| 5 | 57.475 | 4.45 | 1.76802 | 49.2 |
| 6* | −14.399 | 3.52 | | |
| 7* | −5.527 | 2.20 | 1.63550 | 23.9 |
| 8* | −16.114 | 0.15 | | |
| 9 | 189.354 | 6.00 | 1.76802 | 49.2 |
| 10* | −13.731 | (Variable) | | |
| 11 | ∞ | 1.00 | 1.49171 | 57.4 |
| 12 | ∞ | 23.00 | | |
| 13 | (Eye Point) | | | |

Aspheric Data

6th Surface K=−6.90825e−001 A4=8.38523e−005 A6=−6.11664e−007 A8=7.67392e−009 A10=−4.11453e−011

7th Surface K=−1.90508e+000 A4=3.96382e−005 A6=−1.65188e−006 A8=−8.19135e−009 A10=9.04048e−011
8th Surface K=−7.66349e+000 A4=2.88263e−004 A6=−3.08349e−006 A8=1.31547e−008 A10=−1.74846e−011
10th Surface K=−1.83793e+000 A4=−1.51567e−005 A6=−4.27702e−007 A8=4.02270e−009 A10=−1.15184e−011

| VARIABLE INTERVAL | | | | |
|---|---|---|---|---|
| | 0 m−1 | −1 | −5 | +2 |
| d4 | 2.72 | 2.37 | 1.07 | 3.55 |
| d10 | 1.45 | 1.80 | 3.09 | 0.62 |

Various values in each numerical example are summarized in Tables 1 to 3 below. In each table, the values of the inequalities (5) to (8) are abbreviated as "sfa1", "sfg1", "sfa2", and "sfa3", respectively.

TABLE 1

| | | Ex 1 | Ex 2 | Ex 3 | Ex 4 |
|---|---|---|---|---|---|
| (1) | d1/f | 0.684 | 0.788 | 0.792 | 0.662 |
| (2) | d23/d12 | 0.159 | 0.041 | 0.089 | 0.055 |
| (3) | f1/f | 0.831 | 0.735 | 0.831 | 0.906 |
| (4) | f3/f1 | 1.128 | 1.189 | 1.214 | 0.983 |
| (5) | sfa1 | 1.700 | 2.706 | 7.848 | 2.118 |
| (6) | sfg1 | 0.490 | 0.374 | 0.740 | 0.506 |
| (7) | sfg2 | −3.221 | −1.129 | −1.722 | 2.137 |
| (8) | sfg3 | 0.826 | 0.808 | 0.960 | 1.027 |
| (9) | Ndg1 | 1.768 | 1.851 | 1.535 | 1.768 |
| (10) | Ndg2 | 1.636 | 1.651 | 1.636 | 1.636 |
| (11) | Ndg3 | 1.768 | 1.851 | 1.535 | 1.768 |
| (12) | vdg1 | 49.240 | 40.100 | 55.730 | 49.240 |
| (13) | vdg2 | 23.890 | 21.500 | 23.890 | 23.890 |
| (14) | vdg3 | 49.240 | 40.100 | 55.730 | 49.240 |
| (15) | gt2/f | 0.064 | 0.082 | 0.071 | 0.076 |
| (16) | Ndg0 | 1.834 | 1.834 | 1.51633 | 1.834 |
| (17) | vdg0 | 37.160 | 37.160 | 64.10 | 37.160 |

TABLE 2

| | | Ex 5 | Ex 6 | Ex 7 | Ex 8 |
|---|---|---|---|---|---|
| (1) | d1/f | 0.695 | 0.693 | 0.806 | 1.025 |
| (2) | d23/d12 | 0.054 | 0.043 | 0.108 | 0.068 |
| (3) | f1/f | 0.750 | 0.824 | 0.634 | 0.718 |
| (4) | f3/f1 | 1.216 | 1.096 | 1.470 | 1.333 |
| (5) | sfa1 | 3.047 | 2.246 | 2.793 | 1.953 |
| (6) | sfg1 | 0.512 | 0.599 | 0.397 | 0.141 |
| (7) | sfg2 | −1.413 | −2.044 | −1.020 | −1.303 |
| (8) | sfg3 | 0.833 | 0.865 | 0.598 | 0.386 |
| (9) | Ndg1 | 1.768 | 1.768 | 1.851 | 1.882 |
| (10) | Ndg2 | 1.636 | 1.636 | 1.651 | 1.651 |
| (11) | Ndg3 | 1.768 | 1.768 | 1.851 | 1.531 |
| (12) | vdg1 | 49.240 | 49.240 | 40.100 | 37.220 |
| (13) | vdg2 | 23.890 | 23.890 | 21.500 | 21.500 |
| (14) | vdg3 | 49.240 | 49.240 | 40.100 | 56.000 |
| (15) | gt2/f | 0.085 | 0.118 | 0.089 | 0.076 |
| (16) | Ndg0 | 1.834 | 1.834 | 1.834 | 1.834 |
| (17) | vdg0 | 37.160 | 37.160 | 37.160 | 37.160 |

TABLE 3

| | | Ex 9 | Ex 10 | Ex 11 |
|---|---|---|---|---|
| (1) | d1/f | 0.567 | 0.662 | 0.679 |
| (2) | d23/d12 | 0.078 | 0.043 | 0.043 |
| (3) | f1/f | 0.967 | 0.824 | 0.824 |
| (4) | f3/f1 | 0.954 | 1.096 | 1.096 |
| (5) | sfa1 | 2.388 | 2.246 | 2.246 |
| (6) | sfg1 | 0.651 | 0.599 | 0.599 |
| (7) | sfg2 | −1.621 | −2.044 | −2.044 |
| (8) | sfg3 | 0.453 | 0.865 | 0.865 |
| (9) | Ndg1 | 1.768 | 1.768 | 1.768 |
| (10) | Ndg2 | 1.636 | 1.636 | 1.636 |
| (11) | Ndg3 | 1.535 | 1.768 | 1.768 |
| (12) | vdg1 | 49.240 | 49.240 | 49.240 |
| (13) | vdg2 | 23.890 | 23.890 | 23.890 |
| (14) | vdg3 | 55.730 | 49.240 | 49.240 |
| (15) | gt2/f | 0.077 | 0.118 | 0.118 |
| (16) | Ndg0 | 1.834 | 1.603111 | 1.71995 |
| (17) | vdg0 | 37.160 | 37.160 | 37.160 |

Image Pickup Apparatus

A description will now be given of an image pickup apparatus including the observation optical system according to any of the above examples.

Figure 23:
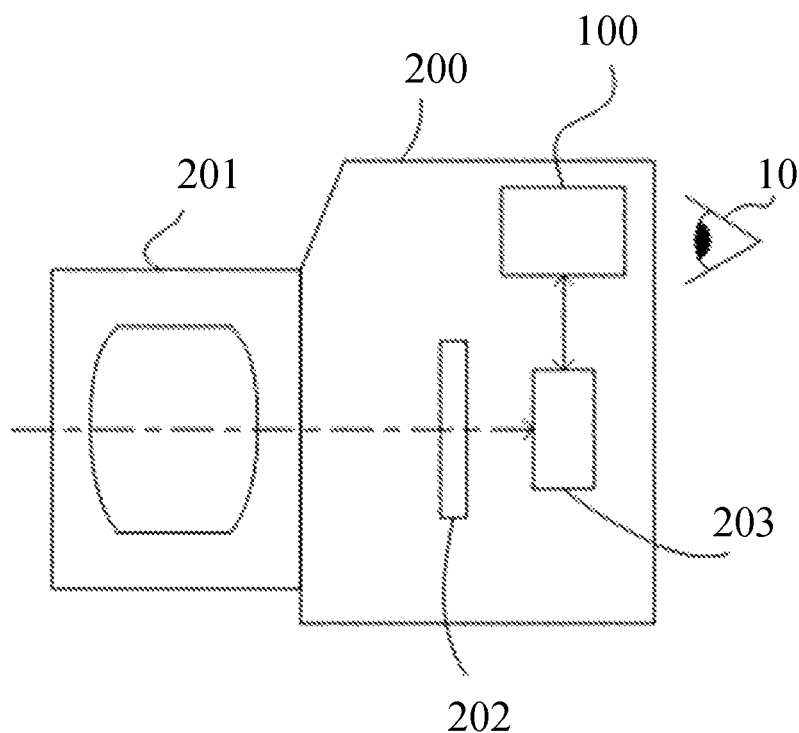
FIG. 23 is a schematic view of an image pickup apparatus.

FIG. 23 illustrates an image pickup apparatus 200, such as a digital still camera and a video camera, in which the observation optical system according to each example is provided as an electronic viewfinder 100.

The image pickup apparatus 200 captures an object image formed by an imaging lens 201 by an image sensor 202 such as a CCD sensor and a CMOS sensor. An imaging signal output from the image sensor 202 is input to a calculational processing circuit (processor) 203. The calculational processing circuit 203 performs various image processing for the imaging signal to generate captured image data. The captured image data is output to the electronic viewfinder 100 and displayed on the display panel in the electronic viewfinder 100. The user can observe the image displayed on the display panel by viewing the observation optical system in the electronic viewfinder 100 using his eyeball 10.

At this time, the calculational processing circuit 203 calculates (acquires) the visual line direction of the user using the data branched and detected by the optical path brancher included in the electronic viewfinder 100. Then, the attention position of the user in the imaging screen is calculated based on the visual line direction. The calculational processing circuit 203 can select an area including the attention position from the imaging screen and perform processing such as automatic exposure and autofocus using the captured image data in the selected area.

Using a compact observation apparatus having high detection accuracy of the visual line in this way can realize a compact image pickup apparatus that can satisfactorily perform processing such as the automatic exposure and autofocus.

Each example can provide an observation optical system which can secure a sufficient space for an optical path brancher, a wide angel of view, and a sufficient eye point length for normal use, and sufficiently correct a curvature of field and astigmatism.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-141265, filed on Aug. 24, 2020, which is hereby incorporated by reference herein in its entirety.

What is claimed is:

1. An observation optical system comprising, in order from a display panel side to an observation side, a first lens having a positive refractive power, a second lens having a negative refractive power, and a third lens having a positive refractive power; and an optical path brancher configured to branch an optical path, and disposed between a display panel and the first lens, wherein an absolute value of a radius of curvature of a lens surface on the observation side of the first lens is smaller than an absolute value of a radius of curvature of a lens surface on the display panel side of the first lens, and wherein the following inequalities are satisfied:

$$0.5 < d1/f < 2.0$$

$$0.0 < d23/d12 < 0.5$$

$$1.60311 \leq Ndg0 < 2.0000$$

$$1.768 \leq Ndg1 < 2.0$$

where d1 is a distance on an optical axis from a display plane of the display panel to the lens surface on the display panel side of the first lens when a diopter is $-1$ m$^{-1}$, f is a focal length of the observation optical system, d23 is a distance on the optical axis from a lens surface on the observation side of the second lens to a lens surface on the display panel side of the third lens, d12 is a distance on the optical axis from the lens surface on the observation side of the first lens to a lens surface on the display panel side of the second lens, and Ndg0 is a refractive index of the optical path brancher for d-line, and Ndg1 is a refractive index of the first lens for d-line.

2. The observation optical system according to claim 1, wherein the following inequality is satisfied:

$$0.02 < gt2/f < 0.15$$

where gt2 is a distance on the optical axis from the lens surface on the display panel side of the second lens to the lens surface on the observation side of the second lens.

3. The observation optical system according to claim 1, wherein the following inequality is satisfied:

$$37 < vdg0 < 75$$

where vdg0 is an Abbe number of the optical path brancher for d-line.

4. The observation optical system according to claim 1, wherein the following inequality is satisfied:

$$0.55 < f1/f < 2.00$$

where f1 is a focal length of the first lens.

5. The observation optical system according to claim 1, wherein the following inequality is satisfied:

$$0.8 < f3/f1 < 2.0$$

where f1 is a focal length of the first lens, and f3 is a focal length of the third lens.

6. The observation optical system according to claim 1, wherein the following inequality is satisfied:

$$1.3 < (G1R2+G2R1)/(G1R2-G2R1) < 15.0$$

where G1R2 is the radius of curvature of the lens surface on the observation side of the first lens, and G2R1 is a radius of curvature of the lens surface on the display panel side of the second lens.

7. The observation optical system according to claim 1, wherein the following inequality is satisfied:

$$0.05 < (G1R1+G1R2)/(G1R1-G1R2) < 2.00$$

where G1R1 is the radius of curvature of the lens surface on the display panel side of the first lens, and G1R2 is the radius of curvature of the lens surface on the observation side of the first lens.

8. The observation optical system according to claim 1, wherein the following inequality is satisfied:

$$-10.0 < (G2R1+G2R2)/(G2R1-G2R2) < -0.3$$

where G2R1 is a radius of curvature of the lens surface on the display panel side of the second lens, and G2R2 is a radius of curvature of the lens surface on the observation side of the second lens.

9. The observation optical system according to claim 1, wherein the following inequality is satisfied:

$$0.1 < (G3R1+G3R2)/(G3R1-G3R2) < 3.0$$

where G3R1 is a radius of curvature of the lens surface on the display panel side of the third lens, and G3R2 is a radius of curvature of a lens surface on the observation side of the third lens.

10. The observation optical system according to claim 1, wherein the following inequality is satisfied:

$$1.6 < Ndg2 < 1.8$$

where Ndg2 is a refractive index of the second lens for d-line.

11. The observation optical system according to claim 1, wherein the following inequality is satisfied:

$$1.5 < Ndg3 < 2.0$$

where Ndg3 is a refractive index of the third lens for d-line.

12. The observation optical system according to claim 1, wherein the following inequality is satisfied:

$$30 < vdg1 < 70$$

where vdg1 is an Abbe number of the first lens for d-line.

13. The observation optical system according to claim 1, wherein the following inequality is satisfied:

$$18 < vdg2 < 30$$

where vdg2 is an Abbe number of the second lens for d-line.

14. The observation optical system according to claim 1, wherein the following inequality is satisfied:

$$30 < vdg3 < 70$$

where vdg3 is an Abbe number of the third lens for d-line.

15. The observation optical system according to claim 1, further comprising a fourth lens having a positive refractive power and disposed on the observation side of the third lens.

16. The observation optical system according to claim 1, further comprising a display panel configured to display an image.

17. The observation optical system according to claim 1, wherein the following inequality is satisfied:

$$1.71995 \leq Ndg0 < 2.0000$$

18. The observation optical system according to claim 1, wherein the following inequality is satisfied:

$$0.0 < d23/d12 \leq 0.159.$$

19. An apparatus comprising:
an observation optical system; and
an image sensor,
wherein the observation optical system includes, in order from a display panel side to an observation side, a first lens having a positive refractive power, a second lens having a negative refractive power, and a third lens having a positive refractive power; and an optical path brancher configured to branch an optical path, and disposed between a display panel and the first lens, wherein an absolute value of a radius of curvature of a lens surface on the observation side of the first lens is smaller than an absolute value of a radius of curvature of a lens surface on the display panel side of the first lens, and wherein the following inequalities are satisfied:

$0.5 < d1/f < 2.0$ $0.0 < d23/d12 < 0.5$ $1.60311 \leq Ndg0 < 2.0000$ $1.768 \leq Ndg1 < 2.0$ where d1 is a distance on an optical axis from a display plane of the display panel to the lens surface on the display panel side of the first lens when a diopter is $-1$ m$^{-1}$, f is a focal length of the observation optical system, d23 is a distance on the optical axis from a lens surface on the observation side of the second lens to a lens surface on the display panel side of the third lens, d12 is a distance on the optical axis from the lens surface on the observation side of the first lens to a lens surface on the display panel side of the second lens, and Ndg0 is a refractive index of the optical path brancher for d-line, and Ndg1 is a refractive index of the first lens for d-line.

20. The apparatus according to claim 19, wherein the following inequality is satisfied:

$1.71995 \leq Ndg0 < 2.0000$

21. The apparatus according to claim 19, wherein the following inequality is satisfied:

$0.0 < d23/d12 \leq 0.159$

\* \* \* \* \*